United States Patent
Min et al.

(10) Patent No.: US 11,265,051 B2
(45) Date of Patent: Mar. 1, 2022

(54) METHOD, ELECTRONIC DEVICE, AND STORAGE MEANS FOR CONTROLLING DATA COMMUNICATION

(71) Applicant: Samsung Electronics Co., Ltd., Suwon-si (KR)

(72) Inventors: Hyunkee Min, Suwon-si (KR); Youngkow Lee, Suwon-si (KR); Junghun Lee, Suwon-si (KR); Chounjong Nam, Suwon-si (KR); Taehun Lim, Suwon-si (KR); Minwhoa Hong, Suwon-si (KR); Sunkey Lee, Suwon-si (KR); Doosuk Kang, Suwon-si (KR); Bokun Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/256,463

(22) PCT Filed: Jun. 27, 2019

(86) PCT No.: PCT/KR2019/007805
§ 371 (c)(1),
(2) Date: Dec. 28, 2020

(87) PCT Pub. No.: WO2020/009373
PCT Pub. Date: Jan. 9, 2020

(65) Prior Publication Data
US 2021/0273697 A1    Sep. 2, 2021

(30) Foreign Application Priority Data

Jul. 4, 2018   (KR) .................. 10-2018-0077679

(51) Int. Cl.
*H04B 7/04* (2017.01)
*H04B 7/0491* (2017.01)
(Continued)

(52) U.S. Cl.
CPC ......... *H04B 7/0491* (2013.01); *H04B 7/0602* (2013.01); *H04B 7/0617* (2013.01);
(Continued)

(58) Field of Classification Search
CPC .. H04B 7/0491; H04B 17/336; H04B 17/364; H04B 7/0617; H04B 7/0602; H04L 43/0864
See application file for complete search history.

(56) References Cited

U.S. PATENT DOCUMENTS 8,054,225 B2 * 11/2011 Sim ................. H04B 7/026
                                              342/432
2008/0153502 A1 * 6/2008 Park ................. H04W 8/005
                                              455/446
(Continued)

FOREIGN PATENT DOCUMENTS

KR   10-2017-0044994 A    4/2017
KR   10-2019-0067052 A    6/2019

*Primary Examiner* — Jean B Corrielus
(74) *Attorney, Agent, or Firm* — Jefferson IP Law, LLP

(57) ABSTRACT

According to various embodiments, a method of controlling data communication of an electronic device, the method comprising performing the directional wireless communication together with an external electronic device capable of performing the directional wireless communication and the omni-directional wireless communication, by using the first wireless communication circuit, determining the distance between an electronic device and the external electronic device, at least partially on the basis of a signal of the external electronic device received by using the second wireless communication circuit, when the stop or degradation of the directional wireless communication is detected, (Continued)

and determining whether to reattempt the directional wireless communication using the first wireless communication circuit, at least partially on the basis of the determined distance or to start the omni-directional wireless communication using the second wireless communication circuit. Other embodiments are possible.

15 Claims, 11 Drawing Sheets

(51) Int. Cl.
*H04B 17/336* (2015.01)
*H04B 17/364* (2015.01)
*H04B 7/06* (2006.01)
*H04L 43/0864* (2022.01)

(52) U.S. Cl.
CPC ......... *H04B 17/336* (2015.01); *H04B 17/364* (2015.01); *H04L 43/0864* (2013.01)

(56) References Cited

U.S. PATENT DOCUMENTS

| | | | |
|---|---|---|---|
| 2009/0135064 A1* | 5/2009 | Sim | H04B 7/0617 342/368 |
| 2010/0164802 A1 | 7/2010 | Li et al. | |
| 2012/0274513 A1 | 11/2012 | Le Bars et al. | |
| 2017/0111806 A1 | 4/2017 | Roh et al. | |
| 2019/0208395 A1* | 7/2019 | Chau | H04W 64/00 |
| 2020/0212980 A1* | 7/2020 | Hakola | H04W 16/28 |

\* cited by examiner

METHOD, ELECTRONIC DEVICE, AND STORAGE MEANS FOR CONTROLLING DATA COMMUNICATION

CROSS-REFERENCE TO RELATED APPLICATION(S)

This application is a National Phase Entry of PCT international Application No. PCT/KR2019/007805, which was filed on Jun. 27, 2019, and claims priority to Korean Patent Application No. 10-2018-0077679 filed on Jul. 4, 2018, in the Korean Intellectual Property Office, the contents of which are incorporated herein by reference.

BACKGROUND

1. Field

Various embodiments relate to a method, an electronic device, and a storage medium for controlling data communication.

2. Description of the Related Art

A fifth-generation (5G) mobile communication system or a system supporting WiGig communication, which is an IEEE 802.11ad standard technology, can support a high data rate of several Gbps using millimeter waves. Such millimeter waves may be, for example, ultra-high frequencies of 30 to 300 GHz. In a millimeter-wave system, loss of a propagation path may occur due to the use of the ultra-high frequency, and in order to prevent this, a beamforming technique capable of increasing the transmission and reception efficiency of an antenna by concentrating transmission and reception power in a narrow space may be applied.

When the beamforming technology is applied to the millimeter-wave system, in general, an electronic device may divide the space to which beam is to be applied into several sectors oriented in different directions, may perform link detection for each sector, and may transmit the beam to an external electronic device capable of directional wireless communication in the sector that guarantees the best signal quality.

SUMMARY

When using the beamforming technology in the millimeter-wave system, in general, beam training can be performed for each sector for connection or link detection.

For example, if there is a signal received by the external electronic device among signals transmitted by the electronic device, the electronic device may select the sector having the highest channel performance among the sectors based at least partially on the signal received from the external electronic device, and the selected sector can be used for beam transmission. When the selection of the sector to which the beam is to be transmitted is completed, the electronic device may additionally perform precise beam training within the selected sector using a beam refinement protocol (BRP) or a beam tracking (BT) protocol.

When loss of line of sight (LoS) occurs due to a sudden change in the direction of the electronic device or an obstacle while the electronic device performs directional wireless communication with the external electronic device, a sudden decrease in signal-to-noise ratio (SNR) or link loss may occur in directional wireless communication. When a sudden decrease in SNR or link loss occurs in directional wireless communication, the electronic device may perform sector-level sweep (SLS) beam training at a designated period, and the period may be greater than or equal to a beacon time interval. While SLS beam training is performed, data packets may be continuously lost, and if a search fails according to periodically performed SLS beam training, the time during which the electronic device cannot transmit and receive data may increase.

According to various embodiments, when a decrease in SNR and/or link loss occurs due to a sudden change in the direction of an obstacle or an electronic device while the electronic device is performing directional wireless communication with an external electronic device using beamforming technology, the electronic device may determine whether to reattempt directional wireless communication with the external electronic device or whether to start omnidirectional wireless communication.

According to various embodiments, when an electronic device enters a first band coverage in which directional wireless communication is possible while performing omnidirectional wireless communication with the external electronic device, it is possible to change the communication band so that the electronic device can perform directional wireless communication with the external electronic device.

According to various embodiments, an electronic device may include: a housing; a first wireless communication circuit located inside the housing and configured to support directional wireless communication by using beamforming; a second wireless communication circuit located inside the housing and configured to support omnidirectional wireless communication; a processor configured to be operatively connected to the first wireless communication and the second wireless communication circuit; and a memory configured to be operatively connected to the processor. The memory may store instructions that, when executed, cause the processor to: perform directional wireless communication together with an external electronic device capable of performing directional wireless communication and omnidirectional wireless communication using the first wireless communication circuit; determine the distance between the electronic device and the external electronic device based at least partially on a signal of the external electronic device received by the second wireless communication circuit, when interruption or deterioration of the directional wireless communication is detected; and determine whether to reattempt the directional wireless communication using the first wireless communication circuit based at least partially on the determined distance, or to start the omnidirectional wireless communication using the second wireless communication circuit.

According to various embodiments, a method of controlling data communication of an electronic device may include: performing directional wireless communication with an external electronic device capable of performing both directional wireless communication and omnidirectional wireless communication using a first wireless communication circuit configured to support directional wireless communication using beamforming; determining the distance between the electronic device and the external electronic device based at least partially on a signal of the external electronic device received by a second wireless communication circuit configured to support omnidirectional wireless communication when interruption or deterioration of the directional wireless communication is detected; and determining whether to reattempt the directional wireless communication using the first wireless communication circuit based at least partially on the determined distance or to start the omnidirectional wireless communication using the second wireless communication circuit.

According to various embodiments, in a storage medium that stores instructions, the instructions, when executed by at least one circuit, may be configured to cause the at least one circuit to perform at least one operation. The at least one operation may include: performing directional wireless communication with an external electronic device capable of performing directional wireless communication and omnidirectional wireless communication using a first wireless communication circuit configured to support directional wireless communication using beamforming; determining a distance between the electronic device and the external electronic device based at least partially on a signal of the external electronic device received by a second wireless communication circuit configured to support omnidirectional wireless communication when interruption and deterioration of the directional wireless communication is detected; and reattempting the directional wireless communication using the first wireless communication circuit based at least partially on the determined distance or determining whether to start omnidirectional wireless communication using the second wireless communication circuit.

As described above, in a method, an electronic device, and a storage medium for controlling data communication according to various embodiments, when an obstacle is generated or a decrease in SNR and/or link loss occurs due to a sudden change in the direction of the electronic device while the electronic device is performing directional wireless communication, the electronic device may determine whether to attempt directional wireless communication or whether to start omnidirectional wireless communication.

In a method, an electronic device, and a storage medium for controlling data communication according to various embodiments, when the electronic device enters a first band coverage in which directional wireless communication is possible while performing omnidirectional wireless communication with the external electronic device, it is possible to change a communication band so that the electronic device can perform directional wireless communication with the external electronic device.

DETAILED DESCRIPTION

Figure 1:
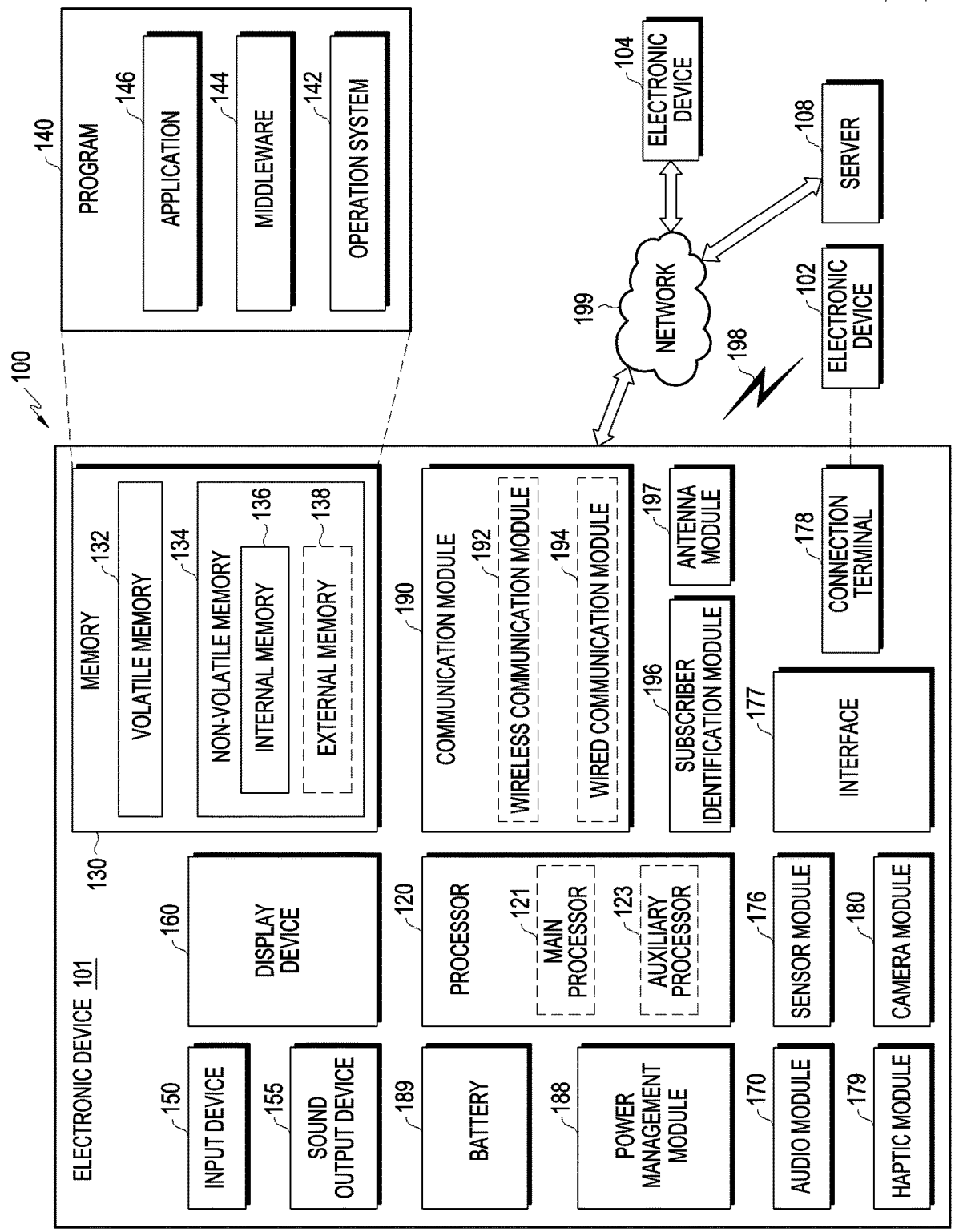
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by a component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and at least one antenna appropriate for a communication scheme used in the communication network, such as the first network 198 or the second network 199, may be selected, for example, by the communication module 190 from the one or more antennas. The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
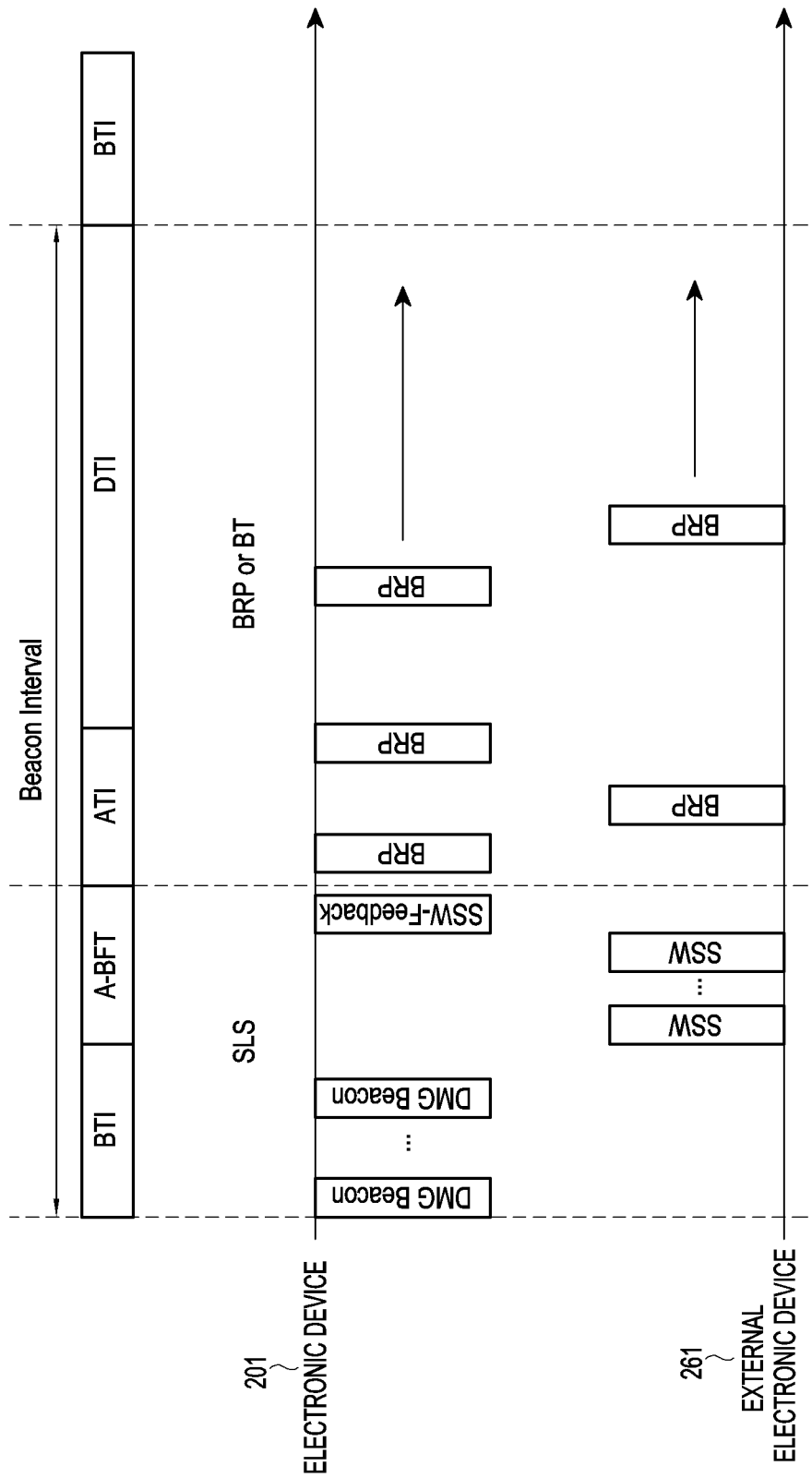
FIG. 2 is a diagram illustrating a connection and communication operation between electronic devices supporting the 802.11ad standard technology according to various embodiments of the disclosure.

FIG. 2 is a diagram illustrating a connection and communication operation between electronic devices supporting the 802.11ad standard technology according to various embodiments of the disclosure.

According to an embodiment, when a connection and data communication operation between an electronic device 201 (e.g., the electronic device 101) and an external electronic device 261 (e.g., the electronic device 104) which support the 802.11ad standard technology are performed, the electronic device 201 and the external electronic device 261 may use various beamforming protocols of the 802.11ad standard technology. The beamforming protocol of the 802.11ad standard technology may include a sector-level sweep (SLS) protocol, a beam refinement protocol (BRP), and/or a protocol of beam tracking (BT), and for connections and/or data communication between electronic devices, each protocol may be selectively used.

The SLS protocol is a protocol for link detection. The electronic device 201 may perform SLS beam training (SLS operation) using the SLS protocol. For example, the electronic device 201 may perform an operation of transmitting a frame (e.g., a beacon frame or a sector sweep (SSW) frame; also referred to as a packet) containing the same content continuously or at specified intervals while changing the direction of the frame. If there is a frame that the external electronic device 261 has successfully received among the frames transmitted by the electronic device 201, the electronic device 201 may select the direction with the highest link (channel) performance among the directions of the frames that have been successfully received.

The BRP is a protocol that finely adjusts the beam direction in order to maximize a data rate in the beam direction determined by the SLS protocol or other means. In the BRP, a method of attaching a training sequence of a certain length to the end of one frame to transmit and receive the frame and calculating and multiplying a phase value for maximizing a data rate for each antenna may be applied.

The BT protocol is a protocol capable of simultaneously performing data transmission and beam training. In the BT protocol, a method of causing beam-training information to be included in a PHY header of a data frame and causing a sequence for beam training to be included in the end of the data frame to perform beam training while transmitting data may be applied.

According to an embodiment, the electronic device 201 may transmit a frame (e.g., a DMG beacon) while changing the direction for each sector using the SLS protocol at a beacon transmission interval (BTI) among the beacon intervals. Next, the electronic device 201 may perform SLS beam training using a frame (e.g., SSW) in association beamforming training (A-BFT) among the beacon intervals. For example, the external electronic device 261 may transmit the frame (e.g., SSW), and the electronic device 201 may transmit feedback (e.g., SSW-feedback) for the frame received from the external electronic device 261 to the external electronic device 261. When link detection through the SLS beam training is completed, the electronic device 201 may use the BRP or the BT protocol in an announcement transmission interval (ATI), among the beacon intervals, to exchange the request-response-based SSW frame with the external electronic device 261, and may use the BRP in a data transfer interval (DTI), among the beacon intervals, to actually perform access. For example, the electronic device 201 may transmit and receive a frame (e.g., BRP), obtained by attaching a training sequence of a certain length to the end of one frame, to and from the external electronic device 261 using a BRP in an ATI and a DTI, and may perform access.

After the access is completed, the electronic device 201 may transmit and receive data to and from the external electronic device 261, and may perform additional beam training using the BT protocol during data transmission and reception.

Although not shown, according to various embodiments, the 802.11ad standard technology defines a fast session transfer (FST) protocol. When the electronic device supports both Wi-Gig communication using a 60 GHz band and Wi-Fi communication using 2.4 GHz to 5.0 GHz bands, the FST protocol may be used to change between the two communication bands of the electronic device. For example, the electronic device may perform switching to 2.4 GHz to 5.0 GHz band while using communication in a band 60 GHz using the FST protocol. For example, depending on the case where the electronic device is out of the coverage of the 60 GHz band due to loss of line of sight (LoS) due to a sudden change in the orientation of the electronic device, the presence of an obstacle between the electronic device and the external electronic device, or an increase in the distance between the electronic device and the external electronic device, when communication in the 60 GHz band is impossible, the electronic device may switch the communication band to the 2.4 GHz to 5.0 GHz band using the FST protocol. For example, the electronic device may switch the communication band to the 60 GHz band while using communication in the 2.4 GHz to 5.0 GHz band using the FST protocol. For example, when entering (located in) a range within which communication in the 60 GHz band is possible, the electronic device can use the communication in the 2.4 GHz to 5.0 GHz bands using the FST protocol and then switch the communication band to the 60 GHz band.

Figure 3:
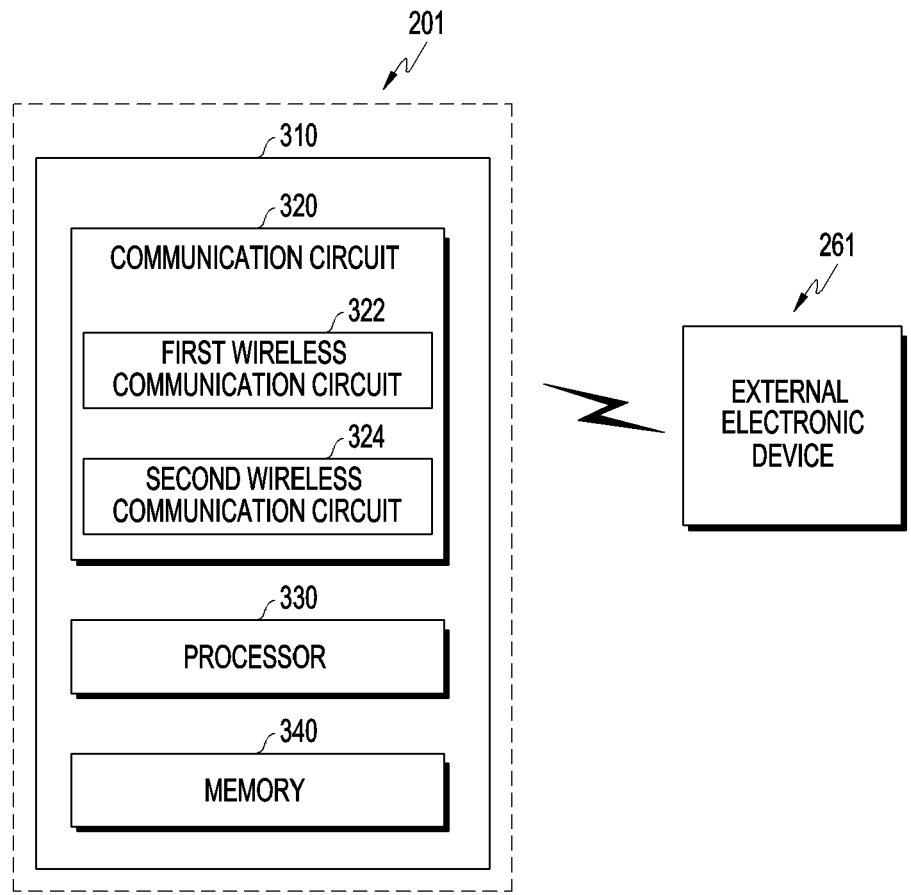
FIG. 3 is a block diagram illustrating an electronic device communicating with an external electronic device according to various embodiments of the disclosure.

FIG. 3 is a block diagram illustrating an electronic device 201 communicating with an external electronic device 261 according to various embodiments of the disclosure.

Referring to FIG. 3, the electronic device 201 may include a housing 310, a communication circuit 320 (e.g., the communication module 190), a processor 330 (e.g., the processor 120), and a memory 340 (e.g., the memory 130).

According to an embodiment, the housing 310 may include an inner space. For example, at least one component (e.g., the communication circuit 320, the processor 330, and/or the memory 340) of the electronic device 201 may be located in the housing 310.

According to an embodiment, the communication circuit 320 may include a first wireless communication circuit 322 and a second wireless communication circuit 324.

For example, the first wireless communication circuit 322 may be configured to support directional wireless communication by applying a beamforming technology (e.g., a beamforming technology using an antenna array). For example, the first wireless communication circuit 322 may include a circuit configured to communicate with the external electronic device 261 using a frequency between 10 GHz and 100 GHz, and the beamforming technology is applied to increase the efficiency of wireless communication. For example, the first wireless communication circuit 322 may include a circuit configured to perform WiGig communication in the frequency band of 60 GHz of the 802.11ad standard technology, and beamforming technology may be applied to the circuit configured to perform WiGig communication. For example, when beams are formed between the electronic device 201 and the external electronic device 261, the first wireless communication circuit 322 may be configured such that a communication link (communication channel) between the electronic device 201 and the external electronic device 261 can be automatically established.

For example, the second wireless communication circuit 324 may be configured to support omnidirectional wireless communication. For example, the second wireless communication circuit 324 may include a circuit configured to perform Wi-Fi communication in a frequency band of 2.5 to 5 GHz.

According to an embodiment, the processor 330 may include one or more of a central processing unit (CPU), an application processor (AP), or a communication processor (CP).

According to an embodiment, the processor 330 may control communication with the external electronic device 261 using the communication circuit 320.

For example, when the electronic device 201 performs directional wireless communication (communication in a first band) with the external electronic device 261 using the first wireless communication circuit 322 under the control of the processor 330, the electronic device 201 may receive information on omnidirectional wireless communication in a second band (communication in a second band) of the external electronic device 261 from the external electronic device 261, and/or may transmit information on omnidirectional wireless communication in a second band (communication in a second band) of the electronic device 201 to the external electronic device 261.

As another example, when the electronic device 201 performs omnidirectional wireless communication (communication in a second band) with the external electronic device 261 using the second wireless communication circuit 324 under the control of the processor 330, the electronic device 201 may receive information on directional wireless communication in a first band (communication in a first band) of the external electronic device 261 from the external electronic device 261, and/or may transmit information on directional wireless communication in a first band (communication in a first band) of the electronic device 201 to the external electronic device 261.

According to an embodiment, when there is a mismatch in the beam direction related to communication in the first band with the external electronic device 261 due to loss of the LoS of the electronic device 201 due to a change in the direction of the electronic device 201 or an obstacle within the coverage of the first band where communication in the first band is possible while the processor is performing communication in the first band using the first wireless communication circuit 322, the processor may recognize the same.

According to an embodiment, the processor 330 of the electronic device 201 may perform a beam-training operation for the first band. For example, the processor 330 may perform beam training using SLS, BRP, and/or BT, which are beamforming protocols of the 802.11ad standard technology. Based on the result of performing the beam training, the processor 330 may select a direction with superior performance of the link (or channel) of the first band as an optimal beam direction. For example, the processor 330 may check link quality values (e.g., SNR) for a plurality of directions, and may select the direction having the highest link quality value or a link quality value equal to or greater than a predetermined threshold as the optimal beam direction.

According to an embodiment, when a decrease in the signal-to-noise ratio (SNR) of the first band or link loss occurs because the processor is out of the first band coverage while the processor 330 is performing communication in the first band using the first wireless communication circuit 322, the processor 330 may recognize the same.

According to an embodiment, the processor 330 may switch the communication band to use the communication in the second band while using the communication in the first band. For example, the processor 330 may switch the communication band to use the communication in the second band while using the communication in the first band using the FST protocol of the 802.11ad standard technology.

For example, when the communication band is switched to use the communication in the second band while the communication in the first band is being used, the processor 330 may perform communication in the second band with the external electronic device 261 while performing an operation for communication access in the second band. As another example, the electronic device 201 may be in a state of being connected to the external electronic device 261 through both the communication in the first band and the communication in the second band. In this case, when the communication band is switched to use the communication in the second band while the communication in the first band is being used, the processor 330 may perform communication in the second band with the external electronic device 261 without performing the operation for communication access in the second band.

According to an embodiment, the processor 330 may collect the SNR of the second band and/or channel state information (CSI) of the second band, and may determine whether to switch the communication band from the communication in the second band to the communication in the first band based on the SNR and/or CSI of the second band. For example, the processor 330 may switch the communication band to use the communication in the first band during the communication in the second band, using the FST protocol of the 802.11ad standard technology.

According to an embodiment, the memory 340 may store a variety of data used by at least one component (e.g., the communication circuit 320, the processor 330, and/or the memory 340) of the electronic device 201.

According to an embodiment, the external electronic device 261 may perform directional wireless communication or omnidirectional wireless communication. For example, the external electronic device 261 may include a circuit configured to support directional wireless communication and/or a circuit configured to support omnidirectional wireless communication by applying beamforming technology thereto. For example, the external electronic device 261 may be various types of electronic devices such as an access point (AP) device or a mobile device.

According to various embodiments, an electronic device 201 may include: a housing 310; a first wireless communication circuit 322 located inside the housing 310 and configured to support directional wireless communication using beamforming; a second wireless communication circuit 324 located inside the housing 310 and configured to support omnidirectional wireless communication; a processor 330 configured to be operatively connected to the first wireless communication 322 and the second wireless communication circuit 324; and a memory 340 configured to be operatively connected to the processor 330. The memory 340 may store instructions that, when executed, cause the processor 330 to: perform the directional wireless communication together with an external electronic device 261 capable of performing the directional wireless communication and the omnidirectional wireless communication, using the first wireless communication circuit 322; determine the distance between the electronic device 201 and the external electronic device 261 based at least partially on a signal of the external electronic device 261 received by the second wireless communication circuit 324, when interruption or deterioration of the directional wireless communication is detected; and reattempt the directional wireless communication using the first wireless communication circuit 322 based at least partially on the determined distance, or determine whether to start the omnidirectional wireless communication using the second wireless communication circuit 324.

According to various embodiments, the instructions may cause the processor 330 to change the beam direction of the directional wireless communication when the determined distance is within a selected distance.

According to various embodiments, the instructions may cause the processor 330 to determine a signal-to-noise ratio (SNR) associated with the signal of the external electronic device 261, an amount of change in SNR per unit time, and/or a link loss, and to detect whether the directional wireless communication is interrupted or deteriorated based at least partially on the determined SNR, the determined amount of change in SNR, and/or the determined link loss.

According to various embodiments, the instructions may cause the processor 330 to determine an SNR associated with the signal of the external electronic device 361, a round-trip time (RTT), and/or fine timing measurement (FTM), and to determine a distance between the electronic device 201 and the external electronic device 261 based at least partially on the determined SNR, the determined RTT, and/or the determined FTM.

According to various embodiments, the external electronic device 261 may be one of an AP device or a mobile device.

According to various embodiments, the instructions may cause the processor 330 to reattempt the directional wireless communication using the first wireless communication circuit 322 when the determined distance is less than a designated reference distance.

According to various embodiments, the instructions may cause the processor 330 to determine whether to start the omnidirectional wireless communication using the second wireless communication circuit 324 when the determined distance is equal to or greater than the designated reference distance.

According to various embodiments, the instructions may cause the processor 330 to determine the distance between the electronic device 201 and the external electronic device 261 based at least partially on the signal of the external electronic device 261, which is received through the second wireless communication circuit 324 while performing the omnidirectional wireless communication with the external electronic device 261 using the second wireless communication circuit 324, and to start the directional wireless communication using the first wireless communication circuit 322 based at least partially on the determined distance while performing the omnidirectional wireless communication.

According to various embodiments, the instructions may cause the processor 330 to start the directional wireless communication using the first wireless communication circuit 322 based at least partially on channel state information of the omnidirectional communication of the second wireless communication circuit 324 when the determined distance is less than the selected distance while performing the omnidirectional wireless communication.

According to various embodiments, the instructions may cause the processor 330 to identify whether the electronic device 201 is located in a line-of-sight (LoS) environment of the omnidirectional wireless communication of the second wireless communication circuit 324 based at least partially on channel state information of the omnidirectional wireless communication of the second wireless communication circuit 324, and to start the directional wireless communication using the first wireless communication circuit 322 when the electronic device 201 is located in a LoS environment of the omnidirectional wireless communication of the second wireless communication circuit 324.

Figure 4:
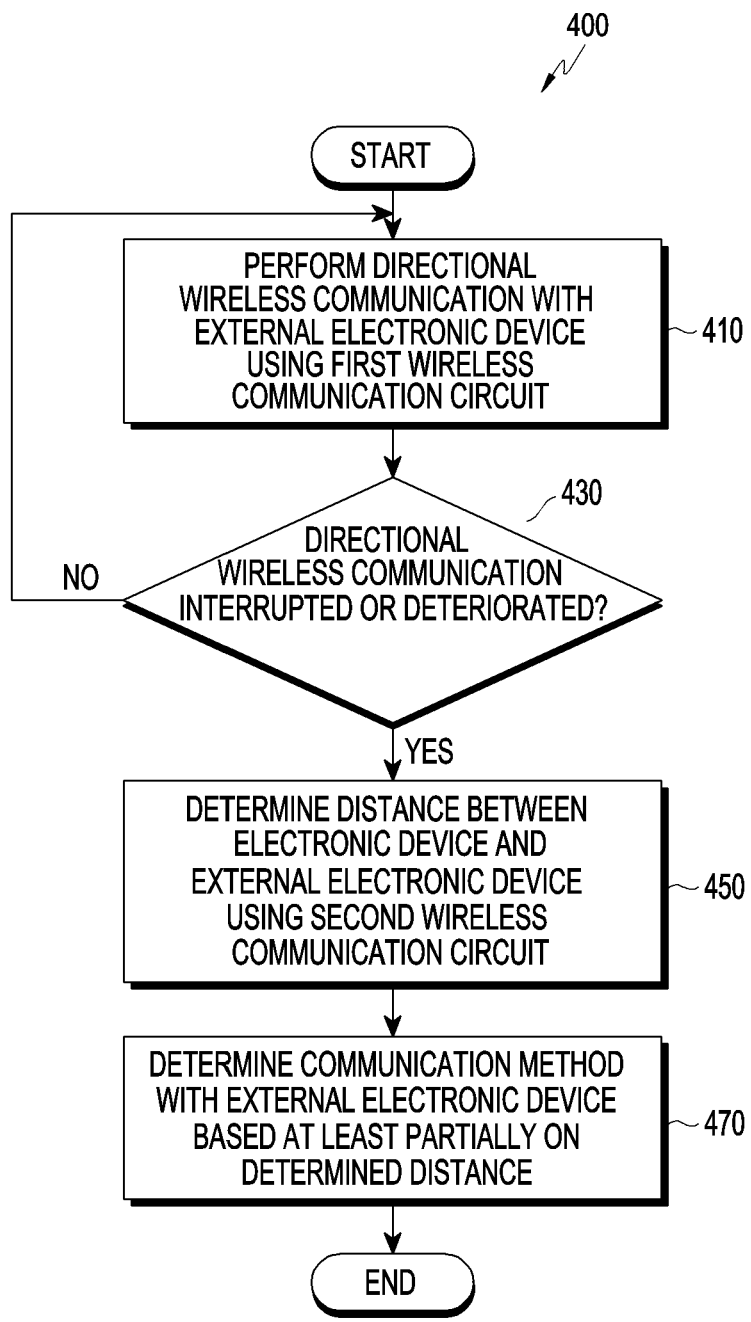
FIG. 4 is a flowchart illustrating an operation of controlling data communication of an electronic device according to various embodiments of the disclosure.

FIG. 4 is a flowchart 400 illustrating an operation of controlling data communication of an electronic device according to various embodiments of the disclosure. A method of controlling data communication may be performed by at least one of an electronic device (e.g., the electronic device 101 or 201), at least one processor (e.g., the processor 120 or 330) of the electronic device, or a controller of the electronic device.

Referring to FIG. 4, in switching a communication band between a first band of directional wireless communication and a second band of omnidirectional wireless communication, an electronic device may distinguish the situation in which a beam direction mismatch of the electronic device occurs due to LoS loss of the electronic device owing to a change in the direction of the electronic device or an obstacle within a first band coverage in which the omnidirectional wireless communication is possible from the situation in which a decrease in SNR and link loss occurs because the electronic device is out of the first band coverage. The electronic device may perform beam training on the first band or may switch the communication band to the second band based on which situation is determined to occur. For example, the beam direction mismatch means that there is a beam direction in which the electronic device can guarantee a superior SNR in the first band, but a decrease in SNR or link loss occurs due to the use of an incorrect beam direction.

In operation 410, the electronic device (e.g., the processor 330) may perform directional wireless communication with an external electronic device (e.g., the external electronic device 261) using a first wireless communication circuit (e.g., the first wireless communication circuit 322).

According to an embodiment, the first wireless communication circuit may be configured to support directional wireless communication in a first band using a beamforming technology.

According to an embodiment, the external electronic device may be configured to support directional wireless communication and omnidirectional wireless communication.

In operation 430, the electronic device (e.g., the processor 330) may detect whether the directional wireless communication is interrupted or deteriorated.

According to an embodiment, when the electronic device is out of a coverage of the directional wireless communication due to loss of LoS owing to a sudden change in the direction of the electronic device or an obstacle between the electronic device and the external electronic device or due to an increase in the distance between the electronic device and the external electronic device, the electronic device may detect interruption or deterioration of the directional wireless communication.

According to an embodiment, the electronic device may detect interruption or deterioration of the directional wireless communication based on an SNR associated with a signal of the external electronic device, an amount of change in the SNR per unit time, and/or link loss.

According to an embodiment, when the electronic device detects that the directional wireless communication is interrupted or deteriorated, the electronic device may execute operation 450, and otherwise may execute operation 410 again.

In operation 450, the electronic device (e.g., the processor 330) may determine the distance between the electronic device and the external electronic device based at least partially on a signal of the external electronic device received through a second wireless communication circuit (e.g., the second wireless communication circuit 324).

According to an embodiment, the second wireless communication circuit may be configured to support omnidirectional wireless communication in the second band.

According to an embodiment, the electronic device may determine the distance between the electronic device and the external electronic device based on an SNR associated with the signal of the external electronic device and/or a round-trip time (RTT). For example, the electronic device may determine the RTT using fine timing measurement (FTM) technology.

According to an embodiment, the electronic device may determine a value related to the distance between the electronic device and the external electronic device or a value that changes depending on the distance between the electronic device and the external electronic device, instead of the distance between the electronic device and the external electronic device. For example, the value related to the distance may include various parameters such as the SNR associated with the signal of the external electronic device, a received signal strength indication (RSSI), and/or a link speed.

In operation 470, the electronic device (e.g., the processor 330) may determine a communication method with the external electronic device based at least partially on the determined distance. For example, the electronic device may determine whether to reattempt the directional wireless communication using the first wireless communication circuit, or may start the omnidirectional wireless communication using the second wireless communication circuit based at least partially on the determined distance.

According to an embodiment, when the determined distance is within a selected distance, the electronic device may reattempt the directional wireless communication, and otherwise, may determine whether to start the omnidirectional wireless communication using the second wireless communication circuit.

For example, the electronic device may determine that a beam direction mismatch of the electronic device has occurred when the determined distance is within the selected distance, and may determine that the electronic device has moved out of the coverage of the first band when the determined distance is outside the selected distance.

For example, when the determined distance is within the selected distance, the electronic device may change the beam direction of the directional wireless communication, and may perform beam training. As another example, the electronic device may determine whether the electronic device is within a distance in which the omnidirectional wireless communication with the external electronic device is possible using the second wireless communication circuit when the determined distance is beyond the selected distance, and may start the omnidirectional wireless communication with the external electronic device when the electronic device is within the distance in which the omnidirectional wireless communication with the external electronic device is possible.

According to an embodiment, the electronic device may determine whether to reattempt the directional wireless communication using the first wireless communication circuit or start the omnidirectional wireless communication using the second wireless communication circuit based at least partially on the value related to the distance between the electronic device and the external electronic device or a value that changes according to the distance between the electronic device and the external electronic device.

According to various embodiments, a method of controlling data communication of an electronic device (e.g., the electronic device 201 or the processor 330 of the electronic device 201) may include: performing directional wireless communication with an external electronic device (e.g., the external electronic device 361) capable of performing directional wireless communication and omnidirectional wireless communication using a first wireless communication circuit (e.g., the first wireless communication circuit 322) configured to support directional wireless communication using beamforming; determining a distance between the electronic device and the external electronic device based at least partially on a signal of the external electronic device received by a second wireless communication circuit (e.g., the second wireless communication circuit 324) configured to support omnidirectional wireless communication when interruption or deterioration of the directional wireless communication is detected; and determining whether to reattempt the directional wireless communication using the first wireless communication circuit based at least partially on the determined distance or to start the omnidirectional wireless communication using the second wireless communication circuit.

According to various embodiments, the reattempting the directional wireless communication using the first wireless communication circuit based at least partially on the determined distance may include changing a beam direction of the directional wireless communication when the determined distance is within a selected distance.

According to various embodiments, the method may further include: determining an SNR associated with a signal of the external electronic device, an amount of change in SNR per unit time, and/or link loss, and the detection of the interruption or deterioration of the directional wireless communication may be performed based at least partially on the determined SNR, the determined amount of change in SNR, and/or the determined link loss.

According to various embodiments, the method may further include: determining the SNR associated with the signal of the external electronic device, a round-trip time (RTT), and/or fine timing measurement (FTM), and the determining the distance with the external electronic device may be performed based at least partially on the determined SNR, the determined RTT, and/or the determined FTM.

According to various embodiments, the method may further include when the determined distance is less than a designated reference distance, reattempt the directional wireless communication using the first wireless communication circuit.

According to various embodiments, the method may further include when the determined distance is equal to or greater than the designated reference distance, starting the omnidirectional wireless communication using the second wireless communication circuit.

According to various embodiments, the method may further include: determining a distance between the electronic device and the external electronic device based at least partially on a signal of the external electronic device received through the second wireless communication circuit while the omnidirectional wireless communication with the external electronic device is performed using the second wireless communication circuit; and starting the directional wireless communication using the first wireless communication circuit based at least partially on the determined distance while the omnidirectional wireless communication is performed.

According to various embodiments, the method may further include when the determined distance is less than the selected distance while the omnidirectional wireless communication is performed, starting the directional wireless communication using the first wireless communication circuit based at least partially on channel state information of the omnidirectional wireless communication of the second wireless communication circuit.

According to various embodiments, the method may further include: identifying whether the electronic device is located in a line-of-sight (LoS) environment of the omnidirectional wireless communication of the second wireless communication circuit based at least partially on channel state information of the omnidirectional wireless communication of the second wireless communication circuit. When the electronic device is located in the LoS environment of the omnidirectional wireless communication of the second wireless communication circuit, the electronic device may start the directional wireless communication may using the first wireless communication circuit.

Figure 5:
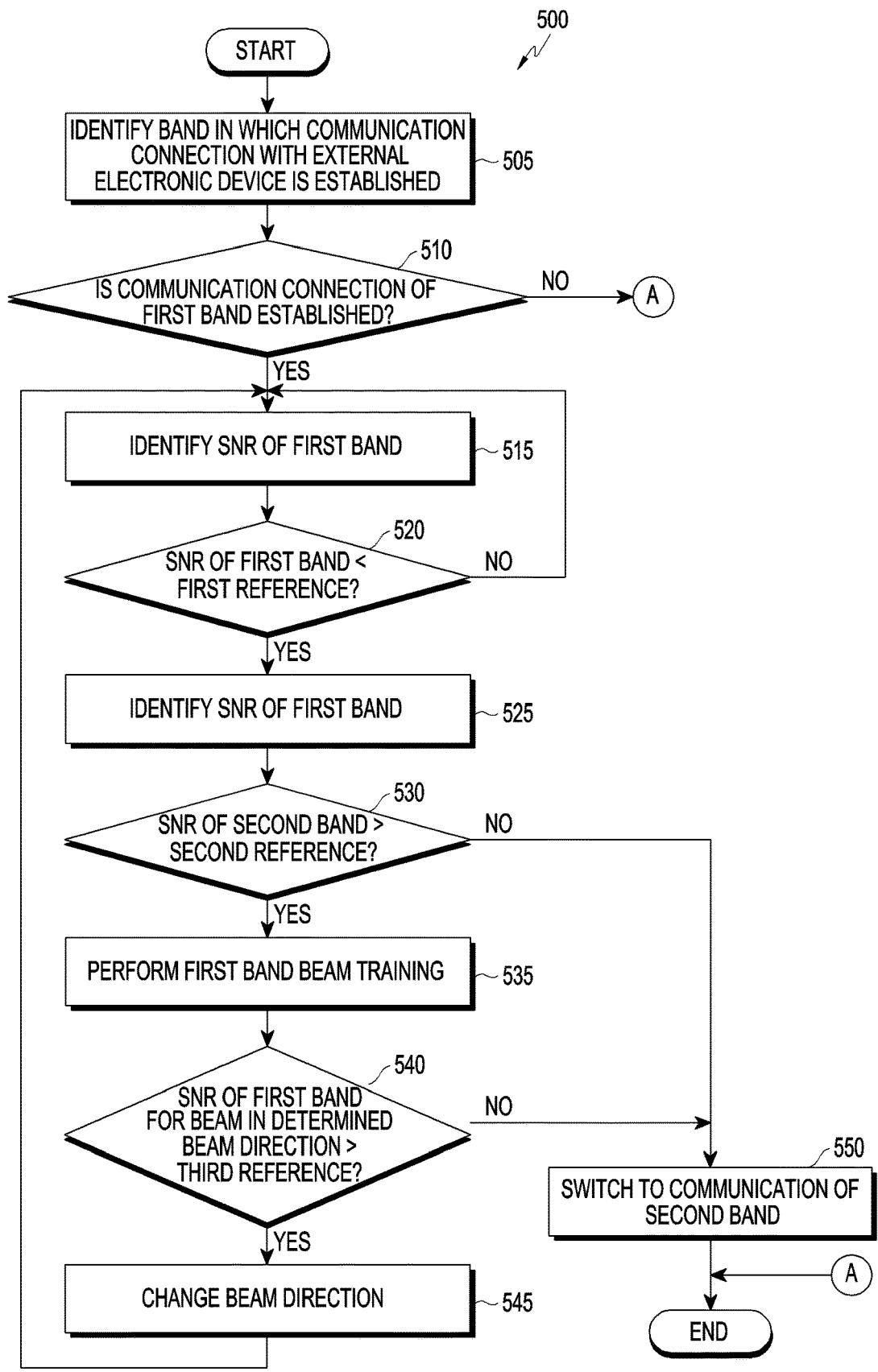
FIG. 5 is a flowchart illustrating an operation of controlling data communication of an electronic device according to various embodiments of the disclosure.
Figure 6:
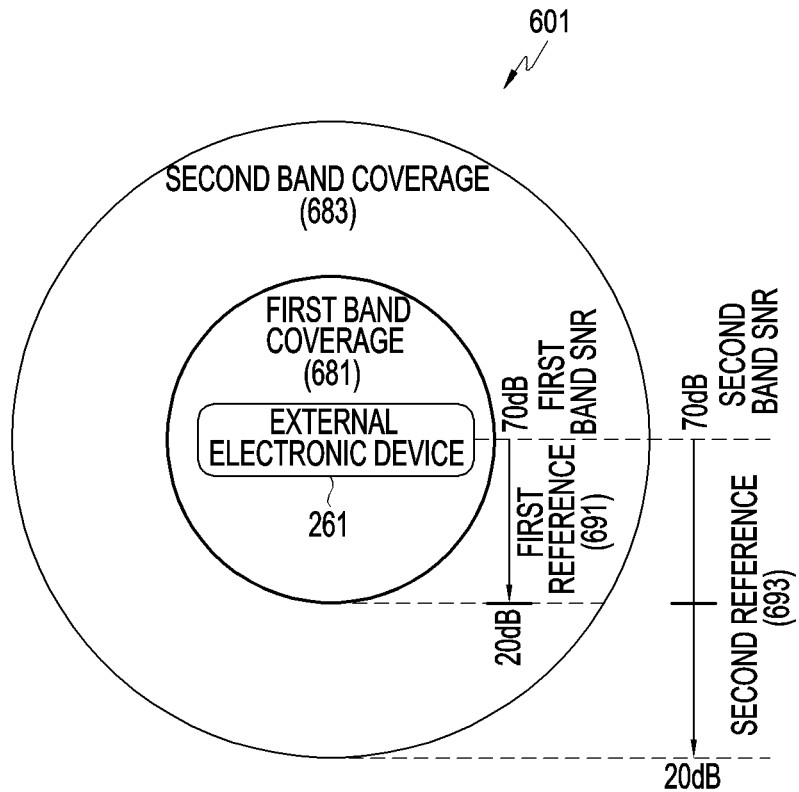
FIG. 6 is a diagram illustrating an operation of controlling data communication of an electronic device according to various embodiments of the disclosure.

FIG. 5 is a flowchart 500 illustrating an operation of controlling data communication of an electronic device according to various embodiments of the disclosure, and FIG. 6 is a diagram 600 illustrating an operation of controlling data communication of an electronic device according to various embodiments of the disclosure. A method of controlling data communication may be performed by at least one of an electronic device (e.g., the electronic device 101 or 201), at least one processor (e.g., the processor 120 or 330) of the electronic device, or a controller of the electronic device.

Referring to FIG. 5, an electronic device that supports both directional wireless communication in a first band (communication in the first band) and omnidirectional wireless communication in a second band (communication in the second band) may perform beam training of the first band, or may switch to the second band to perform communication in the second band, using an SNR value of the first band and an SNR value of the second band while performing communication in the first band with an external electronic device.

In operation 505, the electronic device (e.g., the processor 330) may identify a band communicating with an external electronic device (e.g., the external electronic device 261).

According to an embodiment, the electronic device may include a first wireless communication circuit (e.g., the first wireless communication circuit 322) configured to support communication in the first band by applying a beamforming technology thereto and a second wireless communication circuit (e.g., the second wireless communication circuit 324) configured to support communication in the second band.

In operation 510, the electronic device (e.g., the processor 330) may determine whether a communication connection in the first band is established.

According to an embodiment, when the electronic device determines that the communication connection in the first band is established in operation 510, the electronic device may execute operation 515, and otherwise may terminate the operation of the embodiment.

For example, the electronic device may determine whether a communication connection in the first band is established in a state of a communication connection in the first band and/or a communication connection in the second band with the external electronic device using the first wireless communication circuit and/or the second wireless communication circuit.

As another example, the electronic device may perform communication through the communication connection in the second band when the communication connection in the first band with the external electronic device is not established.

In operation 515, the electronic device (e.g., the processor 330) may identify the SNR of the first band.

According to an embodiment, when a beam direction of the electronic device is selected normally using a beamforming protocol of SLS, BRP, and/or BP within a coverage of the first band, a sufficient SNR value may be guaranteed through the communication in the first band.

In operation 520, the electronic device (e.g., the processor 330) may determine whether the SNR of the first band is less than a first reference.

According to an embodiment, the first reference may be a value determined based on an effective coverage of the communication in the first band.

For example, referring to FIG. 6, the area within which directional wireless communication in the first band with the external electronic device 261 is possible using the first wireless communication circuit (e.g., the first wireless communication circuit 322) by the electronic device (not shown) (e.g., the electronic device 201) may be referred to as a first band coverage 681. For example, the area in which omnidirectional wireless communication in the second band with the external electronic device 261 is possible using the second wireless communication (e.g., the second wireless communication circuit 324) by the electronic device may be referred to as a second band coverage 683.

For example, a first reference 691 may be selected experimentally as a value at which it is determined that it is difficult for the electronic device to maintain the directional wireless communication in the first band at the edge of the first band coverage 681 any longer, or a value at which it is determined to be efficient to switch to the omnidirectional wireless communication in the second band. For example, the first reference 691 may be an SNR value indicating a weak electric field in the first band. For example, assuming that the noise level of the electronic device is −95 dBm, the first reference 691 may be selected as an SNR value of 15 to 20 dB.

For example, when the SNR of the first band is less than the first reference, the electronic device may determine that the directional wireless communication is interrupted or deteriorated. As another example, when the SNR of the first band is greater than or equal to the first reference, the electronic device may determine that the directional wireless communication is not interrupted or deteriorated, may maintain the existing communication in the first band, and may identify the SNR of the first band periodically or when an event (e.g., motion detection or data transmission of the electronic device) occurs.

According to an embodiment, when the electronic device determines that the SNR of the first band is less than the first reference, operation 525 may be executed, and otherwise, operation 515 may be executed again based on a designated period or event occurrence (e.g., motion detection or data transmission of the electronic device).

In operation 525, the electronic device (e.g., the processor 330) may identify an SNR of the second band.

In operation 530, the electronic device (e.g., the processor 330) may determine whether the SNR of the second band is greater than a second reference.

According to an embodiment, the second reference may be determined based on an effective coverage of the communication in the first band. For example, referring to FIG. 6, the second reference 693 is a value used as a criterion for switching from the first band to the second band, and may be determined as the SNR value of the second band identified within the first band coverage 681. For example, the second reference 693 may be determined as a value that can be used as a criterion for determining a decrease in the SNR of the first band due to a mismatch in the beam direction of communication in the first band within the first band coverage 681. For example, the second reference 693 may be an SNR value of the second band that the electronic device has identified at a distance spaced apart from the external electronic device 261 at which the SNR value of the first reference 691 is identified.

For example, when the communication in the first band has a weak electric field SNR value of about 15 to 20 dB, but the SNR of the communication in the second band is identified as a significantly large value of about, for example, 70 dB, it is determined that the electronic device is sufficiently close to the external electronic device 261 and that the electronic device is located within the first band coverage 681, whereby the electronic device may determine that the decrease in the SNR of the first band is caused due to a beam direction mismatch.

According to an embodiment, when the beam direction mismatch occurs due to a sudden change in the direction of the electronic device or the presence of an obstacle due to directivity characteristics in the case of communication in the first band, a sudden decrease in SNR may occur, whereas in the case of communication in the second band, a variation in SNR may be significantly small compared to the communication in the first band due to directivity characteristics. The electronic device may determine whether the electronic device is located within the first band coverage 681 based on the SNR of the second band according to the characteristics of the second band. For example, when the SNR of the first band is less than or equal to the first reference 691 but the SNR of the second band is greater than or equal to the second reference 693, the electronic device may determine that a beam direction mismatch has occurred in the communication in the first band. As another example, when the SNR of the first band is less than or equal to the first reference 691 and the SNR of the second band is less than or equal to the second reference 693, it may be determined that the electronic device is located outside the first band coverage 681.

According to an embodiment, when the electronic device determines that the SNR of the second band is greater than the second reference, the electronic device may execute operation 535, and otherwise may execute operation 550.

In operation 535, the electronic device (e.g., the processor 330) may perform beam training in the first band.

According to an embodiment, the electronic device may perform beam training using SLS, BRP, and/or BT, which are beamforming protocols of the 802.11ad standard technology, and the direction in which the performance of a link (or a channel) is superior may be determined as a beam direction. For example, the electronic device may divide a space into a designated number of sectors in the communication in the first band, and may transmit frames to all of the sectors using the SLS protocol. Upon receiving a response signal for one or more of the transmitted frames from the external electronic device, the electronic device may determine the beam direction based on the one or more response signals.

According to an embodiment, the external electronic device may also perform beam training using a beamforming protocol (e.g., SLS protocol) of the 802.11ad standard technology.

In operation 540, the electronic device (e.g., the processor 330) may determine whether the SNR of the first band for the beam in the beam direction determined through operation 535 is greater than a third reference.

According to an embodiment, the third reference may be determined as a value sufficient to enable communication in the first band. For example, the third reference may be experimentally determined to be a value equal to or greater than the first reference.

According to an embodiment, in operation 540, when it is determined that the SNR of the first band for the beam in the determined beam direction is greater than the third reference, the electronic device may execute operation 545, and otherwise may execute operation 550.

In operation 545, the electronic device (e.g., the processor 330) may change the beam direction.

According to an embodiment, the electronic device may change the beam direction according to a designated condition while maintaining communication in the first band. For example, the electronic device may form a beam of a designated frequency in the changed beam direction, and the electronic device may communicate with the external electronic device in the first band using the formed beam.

According to an embodiment, the electronic device may execute operation 515 again after executing operation 545.

In operation 550, the electronic device (e.g., the processor 330) may switch from the communication in the first band to the communication in the second band.

According to an embodiment, the electronic device may switch the communication band to the communication in the second band so as to perform communication in the second band instead of the communication in the first band, and may perform communication in the second band with the external electronic device.

For example, when switching the communication band to the communication in the second band, the electronic device may use the second wireless communication circuit to perform the communication in the second band with the external electronic device while performing an operation for communication access of the second band using the second wireless communication circuit. As another example, the electronic device may be in a state of being connected to the external electronic device through both the communication in the first band and the communication in the second band using the first wireless communication circuit and the second wireless communication circuit. In this case, when the communication band is switched to the communication in the second band, the electronic device may perform communication in the second band with the external electronic device without performing the operation for communication access in the second band.

In the embodiments of FIGS. 5 and 6 described above, it has been described that the first reference and the second reference are determined based on the effective coverage of the communication in each band. However, according to another embodiment, the electronic device may determine the first reference and the second reference by checking various parameters of throughput, SNR, and/or stability in the first band and the second band. For example, based on the various parameters, a distance point of the electronic device spaced apart from the external electronic device, that is, a gain when switching from the first band to the second band, may be selected as the first reference, and a distance point of the electronic device spaced apart from the external electronic device, that is, a gain when switching from the second band to the first band, may be selected as the second reference.

The SNR of the embodiment of FIG. 5 described above may be replaced with a similar parameter capable of expressing signal quality, such as a received signal strength indication (RSSI) and a link speed.

In the embodiment of operation 535 of FIG. 5 described above, an operation of dividing the space into a designated number of sectors in the communication in the first band when the electronic device performs beam training in the first band and determining the beam direction using all of the sectors resulting from the division has been descried.

However, according to another embodiment, when the electronic device determines (detects) a beam direction mismatch of the electronic device in operation 530, the electronic device may determine the beam direction using some sectors, as in the embodiment of FIG. 7 described later, other than all the sectors.

According to another embodiment, when the electronic device determines (detects) the beam direction mismatch of the electronic device in operation 530, the electronic device may compare the remaining SLS period with the execution time of an operation of determining an angle of arrival (AoA) of the second band, which is operation 710 in the embodiment of FIG. 7 to be described later, and may perform an SLS operation in a predetermined SLS period when the remaining SLS period is shorter than the execution time. For example, the electronic device may perform an operation (SLS operation) of continuously transmitting a frame (e.g., a beacon frame or an SSW frame) while changing the direction of the frame using the SLS protocol every specified period (SLS period). For example, the electronic device may perform the SLS operation before, while, or after performing at least one of operations 505 to 530 according to the SLS period. When the electronic device determines (detects) the beam direction mismatch of the electronic device in operation 530, the electronic device may compare a scheduled time at which to start the SLS operation according to the SLS period with the execution time of an AoA determination operation for the second band, and may perform the SLS operation at the scheduled time while performing the AoA determination operation or without performing the AoA determination operation when the scheduled time to start the SLS operation is shorter than the execution time.

Figure 7:
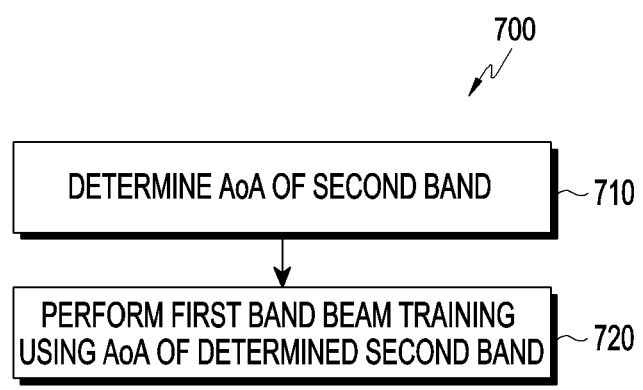
FIG. 7 is a flowchart illustrating a beam-training operation in a first band of an electronic device according to various embodiments of the disclosure.

FIG. 7 is a flowchart 700 illustrating a beam-training operation of a first band of an electronic device according to various embodiments of the disclosure. The beam training may be performed by at least one of an electronic device (e.g., the electronic device 101 or 201), at least one processor (e.g., the processor 120 or 330) of the electronic device, or a controller of the electronic device.

Referring to FIG. 7, the electronic device may support both directional wireless communication in a first band (communication in the first band) and omnidirectional wireless communication in a second band (communication in the second band). For example, the electronic device may perform a beam-training operation in the first band using an angle of arrival (AoA), estimated based on the communication in the second band.

In operation 710, the electronic device (e.g., the processor 330) may determine (estimate) the AoA of the second band.

According to an embodiment, the electronic device may determine the AoA of the second band based on a phase difference between antennas for communication in the second band of the electronic device.

For example, when the electronic device includes two or more antennas for communication in the second band, the phase value of the signal entering each antenna may be different according to an incident angle of a received signal. For example, the electronic device may use Equation 1 for calculating an incident angle using the phase difference between the antennas to determine the AoA of the second band, and the incident angle may be referred to as the AoA.

$$\theta = \sin^{-1} \frac{\Delta \Phi \lambda}{-2\pi d} \qquad \text{Equation 1}$$

(θ: incident angle, ΔΦ: phase difference, λ: wavelength, d: distance between antennas)

As another embodiment, the electronic device may determine the AoA of the second band using a multiple signal classification (MUSIC) algorithm based on phase differences between multiple antennas. The MUSIC algorithm is a technology to track a location by separating a space consisting of data measured by the antennas (or sensors) into a signal space and a noise space and using the fact that a vector of the locations of signal sources is orthogonal to the noise space.

In operation 720, the electronic device (e.g., the processor 330) may perform beam training of the first band using the AoA of the second band.

According to an embodiment, the electronic device may divide the space into a designated number of sectors in the communication in the first band, and may perform beam training only on some sectors in consideration of the determined AoA of the second band among the sectors. For example, the electronic device may perform beam training only on sectors including a value obtained by considering the determined AoA of the second band and a designated or estimated error among the sectors.

For example, when the AoA (incident angle of the second band) of the second band determined by the electronic device has an azimuth angle=x° and elevation=y°, and the designated or estimated error (or designated estimation error) is 15°, the electronic device may configure a range of the azimuth angle to x±15° and a range of the elevation to y±15°. When beam training of the first band is performed, the electronic device may determine only the sectors included in the configured ranges (the range of the azimuth angle and the range of the elevation) as sectors (search candidates) on which beam training is performed, among all the sectors, as in the embodiment of FIG. 8 which will be described later.

Figure 8:
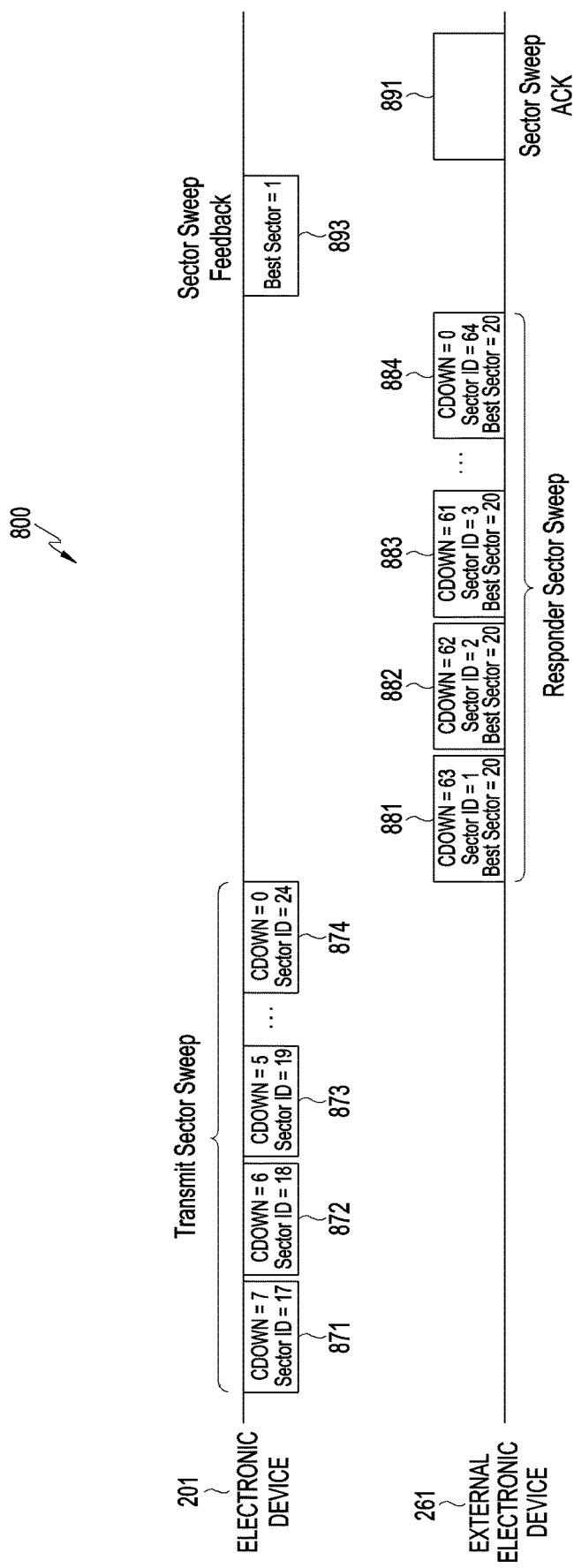
FIG. 8 is a diagram illustrating a beam-training operation using restricted sectors of an electronic device according to various embodiments of the disclosure.

FIG. 8 is a diagram 800 illustrating a beam-training operation using restricted sectors of an electronic device according to various embodiments of the disclosure.

Referring to FIG. 8, it is assumed that the electronic device 201 (e.g., the processor 330) divides a space into 64 sectors by dividing the space into 64 equal parts in communication in a first band and that sector IDs of 1 to 64 are assigned to each sector. For example, when the electronic device 201 performs operation 710 of FIG. 7 described above, assuming that the electronic device determines the AoA of the second band having the azimuth range of x±15°, the elevation range of y±15°, and sector IDs of 17 to 24 of sectors included in the azimuth range and elevation range, the electronic device 201 may perform beam training using only sectors having the sector IDs of 17 to 24 in operation 720 of FIG. 7 described above. For example, the electronic device 201 may perform beam training by transmitting a frame (e.g., an SSW frame) only to sectors having the sector IDs of 17 to 24. For example, using the sectors having the sector IDs of 17 to 24, the electronic device 201 may continuously transmit an SSW frame 871 having a count value (CDOWN) of 7 and the sector ID of 17, an SSW frame 872 having the CDOWN of 6 and the sector ID of 16, an SSW frame 873 having the CDOWN of 5 and the sector ID of 15, . . . , and an SSW frame 874 having the CDOWN of 0 and the sector ID of 24.

For example, if there is no AoA result for the second band in the external electronic device 261, the external electronic device 261 may perform beam training using all sectors with sector IDs of 1 to 64, that is, using all sectors. For example, using the sectors having the sector IDs of 1 to 64, the external electronic device 261 may continuously transmit an SSW frame 881 having a CDOWN of 63 and a sector ID of 1, an SSW frame 882 having a CDOWN of 62 and a sector ID of 2, an SSW frame 883 having a CDOWN of 61 and a sector ID of 3, . . . , and an SSW frame 884 having a CDOWN of 0 and a sector ID of 64.

In an embodiment, when receiving the SSW frame transmitted by the electronic device 210, the external electronic device 261 may determine an optimal sector (e.g., the sector ID is 20) for beam transmission of the electronic device 210. For example, when the external electronic device 261 transmits the SSW frames 881, 882, 883, and 884 using the sectors with the sector IDs of 1 to 64, the external electronic device 261 may also transmit information on the determined optimal sector of the electronic device 210 (Best Sector=20) to the electronic device 210. For example, the information on the optimal sector may be the sector ID.

In an embodiment, when receiving the SSW frame transmitted by the external electronic device 261, the electronic device 201 may transmit a feedback signal 893 to the external electronic device 261. For example, when the electronic device 201 receives at least one of the SSW frames 881, 882, 883, and 884 transmitted by the external electronic device 261, the electronic device 201 may determine the optimal sector for beam transmission to the external electronic device 261, and may allow information on the sector determined to be the optimal sector to be included in the feedback signal 893 to thereby transmit the feedback signal 893 to the external electronic device 261. For example, information on the optimal sector may be the sector ID.

In an embodiment, when receiving at least one of the SSW frames 881, 882, 883, and 884, the electronic device 201 may check an SSW frame having an optimal SNR. For example, the electronic device 201 may determine that the SSW frame 881 having the sector ID of 1 among the SSW frames 881, 882, 883, and 884 has the optimal SNR.

In an embodiment, the electronic device 201 may allow information (e.g., Best Sector=1) of the SSW frame 881 determined as being as the optimal sector to be included in the feedback signal 893 to transmit the feedback signal 893 to the external electronic device 271 in order to instruct the external electronic device 271 to perform a beamforming operation on the sector (e.g., the sector ID is 1) included in the SSW frame 881.

In an embodiment, when the external electronic device 261 receives at least one of the SSW frames 871, 872, 873, and 874 transmitted by the electronic device 201, the external electronic device 261 may identify the SSW frame having the optimal SNR. For example, when the external electronic device 261 determines that the SSW frame (not shown) having the sector ID of 20 among the SSW frames 871, 872, 873, and 874 has the optimal SNR, the SSW frame having the sector ID of 20 may be determined as the optimal sector. For example, in order to instruct the electronic device 201 to perform a beamforming operation with the SSW frame having the sector ID of 20, the external electronic device 261 may transmit the SSW frames 881, 882, 883, and 884 having the sector ID of 20, determined as the optimal sector, to the electronic device 201.

In an embodiment, when the external electronic device 261 receives the feedback signal 893 from the electronic device 201, the external electronic device 261 may transmit a response signal (sector sweep ACK) 891 to the feedback signal 893 to the electronic device 201.

When comparing an embodiment of determining the beam direction using some sectors of the electronic device of FIGS. 7 and 8 described above with an embodiment in which the electronic device determines the beam direction using all sectors, as in operation 535 of FIG. 5 described above, the operation of determining the beam direction using all sectors as in operation 535 of FIG. 5 does not perform the AoA determination operation for the second band, which is operation 710 of FIG. 7, and therefore, unlike FIG. 7, it may have an advantage in that data is not disconnected during a time waiting for the start of the beam-training operation (an advantage in that data is not disconnected during a time waiting for the SLS period).

In the above-described embodiments of FIGS. 7 and 8, the operation of determining the AoA of the second band by the electronic device has been described. However, according to another embodiment, the electronic device may determine the AoA of the first band. In general, as the number of antennas increases, the precision of the AoA determination may increase. For example, when considering the form factor of a conventional smartphone, the number of antennas of a communication system of the second band does not exceed 2 to 4, whereas in the case of the communication system of the first band, a large number (e.g., several tens) of antennas can be used for the AoA determination because a wavelength in mm unit is used, and the AoA determination can be performed more accurately. For example, the AoA determination result of the first band may have a reduced estimation error compared to the AoA determination result of the second band.

In the embodiment of FIG. 8 described above, the case in which there is no AoA result for the second band in the external electronic device 861 has been assumed and described. However, when there is an AoA result for the second band in the external electronic device 861, the external electronic device 861 may perform beam training using only sectors included in the AoA range of the second band according to the AoA result for the second band.

Figure 9:
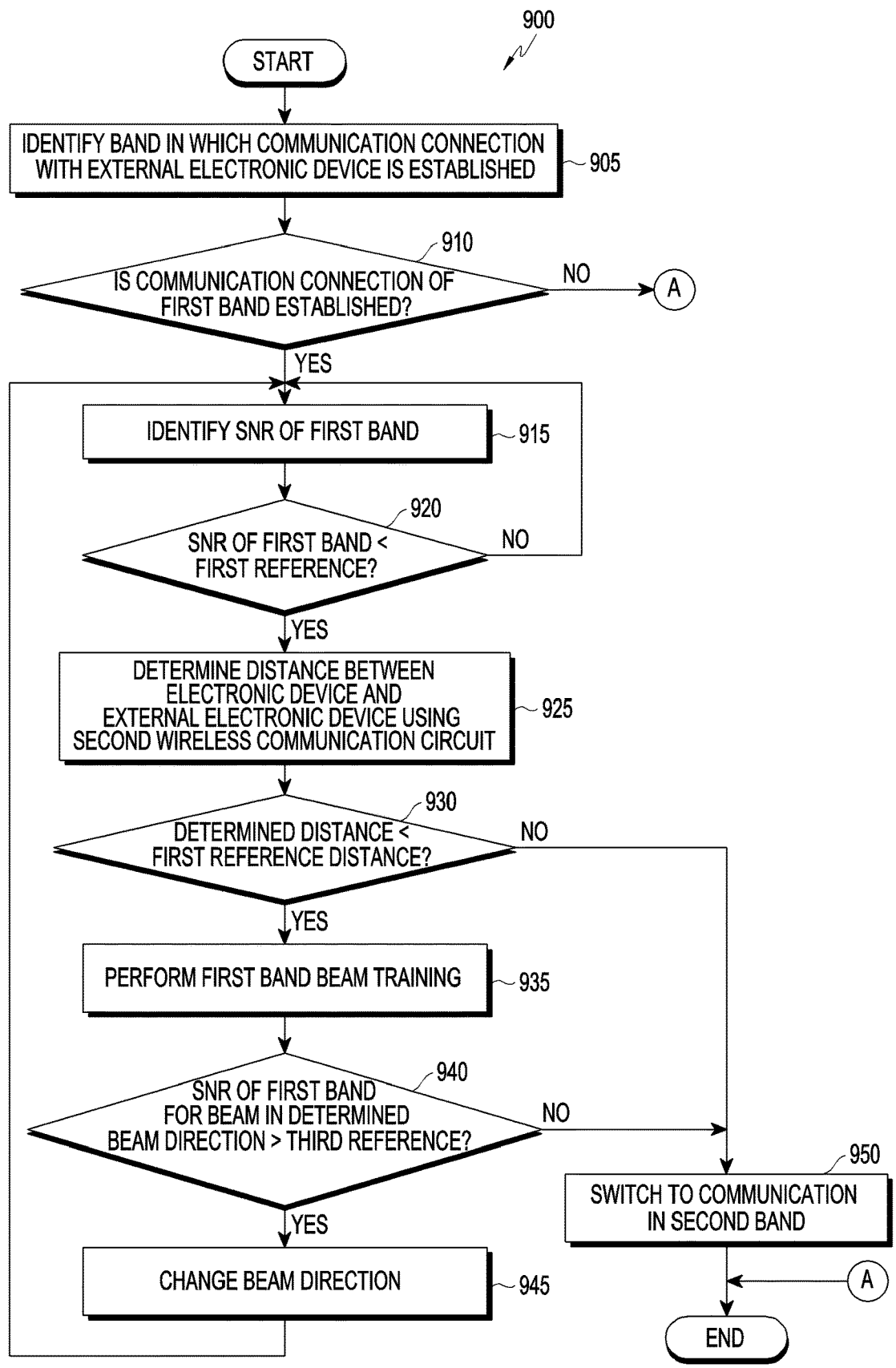
FIG. 9 is a flowchart illustrating an operation of controlling data communication of an electronic device according to various embodiments of the disclosure.

FIG. 9 is a flowchart 900 illustrating an operation of controlling data communication of an electronic device according to various embodiments of the disclosure. A method of controlling data communication may be performed by at least one of an electronic device (e.g., the electronic device 101 or 201), at least one processor (e.g., the processor 120 or 330) of the electronic device, or a controller of the electronic device.

Referring to FIG. 9, an electronic device that supports both directional wireless communication in a first band (communication in the first band) and omnidirectional wireless communication in a second band (communication in the second band) may detect interruption or deterioration of communication in the first band using an SNR of the first band while performing the communication in the first band with an external electronic device, and may determine whether a beam direction mismatch of the electronic device occurs using distance information of the second band.

In operation 905, the electronic device (e.g., the processor 330) may identify a band in which a communication connection with the external electronic device (e.g., the external electronic device 261) is established.

According to an embodiment, the electronic device may include a first wireless communication circuit (e.g., the first wireless communication circuit 322) configured to support communication in the first band and a second wireless communication circuit (e.g., the second wireless communication circuit 324) configured to support communication in the second band by applying beamforming technology thereto.

In operation 910, the electronic device (e.g., the processor 330) may determine whether the communication connection of the first band is established.

According to an embodiment, when it is determined that the communication connection of the first band is established in operation 910, the electronic device may perform operation 915, and otherwise may terminate the operation of the embodiment.

In operation 915, the electronic device (e.g., the processor 330) may identify the SNR of the first band.

In operation 920, the electronic device (e.g., the processor 330) may determine whether the SNR of the first band is less than a first reference.

According to an embodiment, the first reference may be a value determined based on the effective coverage of the communication in the first band. For example, the first reference may be the first reference 691 of FIG. 6.

According to an embodiment, when the electronic device determines that the SNR of the first band is less than the first reference, the electronic device may perform operation 925, and otherwise may perform operation 915 again based on a designated period or event occurrence (e.g., motion detection or data transmission).

Operations 905 to 920 described above may respectively correspond to operations 505 to 520 of FIG. 5.

In operation 925, the electronic device (e.g., the processor 330) may determine the distance between the electronic device and the external electronic device using the second wireless communication circuit.

According to an embodiment, the electronic device may perform fine timing measurement (FTM) of the second band. For example, the electronic device may determine a round-trip time (RTT) based on the FTM result of the second band, and may determine the distance between the electronic device and the external electronic device based on the RTT.

In operation 930, the electronic device (e.g., the processor 330) may determine whether the determined distance is less than a first reference distance d_th.

According to an embodiment, the first reference distance may be a distance value indicating a first band coverage. For example, the first reference distance may be a value determined in advance through experimentation, or may be determined by the electronic device.

According to an embodiment, the operation of determining whether the determined distance is smaller than the first reference distance may be used for the electronic device to determine whether the SNR of the first band less than the first reference is caused due to the beam direction mismatch of the electronic device or due to moving out of the first band coverage. For example, when the determined distance is less than the first reference distance, the electronic device may determine that it is caused due to the beam direction mismatch of the electronic device, and accordingly, may perform operation 935 related thereto. As another example, when the determined distance using the second band is greater than or equal to the first reference distance, the electronic device may determine that the electronic device has moved out of the first band coverage, and accordingly, may perform an operation of switching from communication in the first band to communication in the second band in operation 950.

According to an embodiment, when the electronic device determines in operation 930 that the determined distance is less than the first reference distance, the electronic device may perform operation 935, and otherwise, may perform operation 950.

In operation 935, the electronic device (e.g., the processor 330) may perform beam training of the first band.

According to an embodiment, the electronic device may perform beam training using SLS, BRP, and/or BT, which are beamforming protocols of the 802.11ad standard technology, and according to the beam training, the electronic device may determine the direction in which a link (or a channel) has superior performance to be the beam direction.

According to an embodiment, the beam-training operation for the first band may be an operation of dividing a space into a designated number of sectors in the communication in the first band and determining the beam direction using all of the sectors resulting from the division when the beam training of the first band is performed, as in the embodiment of operation 535 of FIG. 5 described above.

According to another embodiment, the beam-training operation for the first band may be an operation of determining the beam direction using some sectors of the space through the communication in the first band according to the operations of the embodiment of FIG. 7 described above.

In operation 940, the electronic device (e.g., the processor 330) may determine whether the SNR of the first band for the beam in the beam direction determined through operation 935 is greater than a third reference.

According to an embodiment, the third reference may be determined as a value sufficient to enable communication in the first band. For example, the third reference may be experimentally determined to be a value equal to or greater than the first reference.

According to an embodiment, when the electronic device determines that the SNR of the first band for the beam in the determined beam direction is greater than the third reference in operation 940, the electronic device may perform operation 945, and otherwise, may perform operation 950.

In operation 945, the electronic device (e.g., the processor 330) may change the beam direction.

According to an embodiment, the electronic device may change the beam direction while maintaining the communication in the first band.

In operation 950, the electronic device (e.g., the processor 330) may switch to communication in the second band.

According to an embodiment, the electronic device may switch the communication band to the communication in the second band so as to perform the communication in the second band instead of the communication in the first band, and may perform the communication in the second band with the external electronic device.

For example, when the electronic device switches the communication band to the communication in the second band, the electronic device may perform the communication in the second band with the external electronic device while performing an operation for a communication connection of the second band using the second wireless communication circuit. As another example, the electronic device may be in a state of being connected to the external electronic device through both the communication in the first band and the communication in the second band using the first wireless communication circuit and the second wireless communication circuit. In this case, when the communication band is switched to the communication in the second band, the electronic device may perform the communication in the second band with the external electronic device without performing the operation for the communication connection of the second band.

Operations 935 to 950 described above may correspond to operations 535 to 550 of FIG. 5, respectively.

Figure 10:
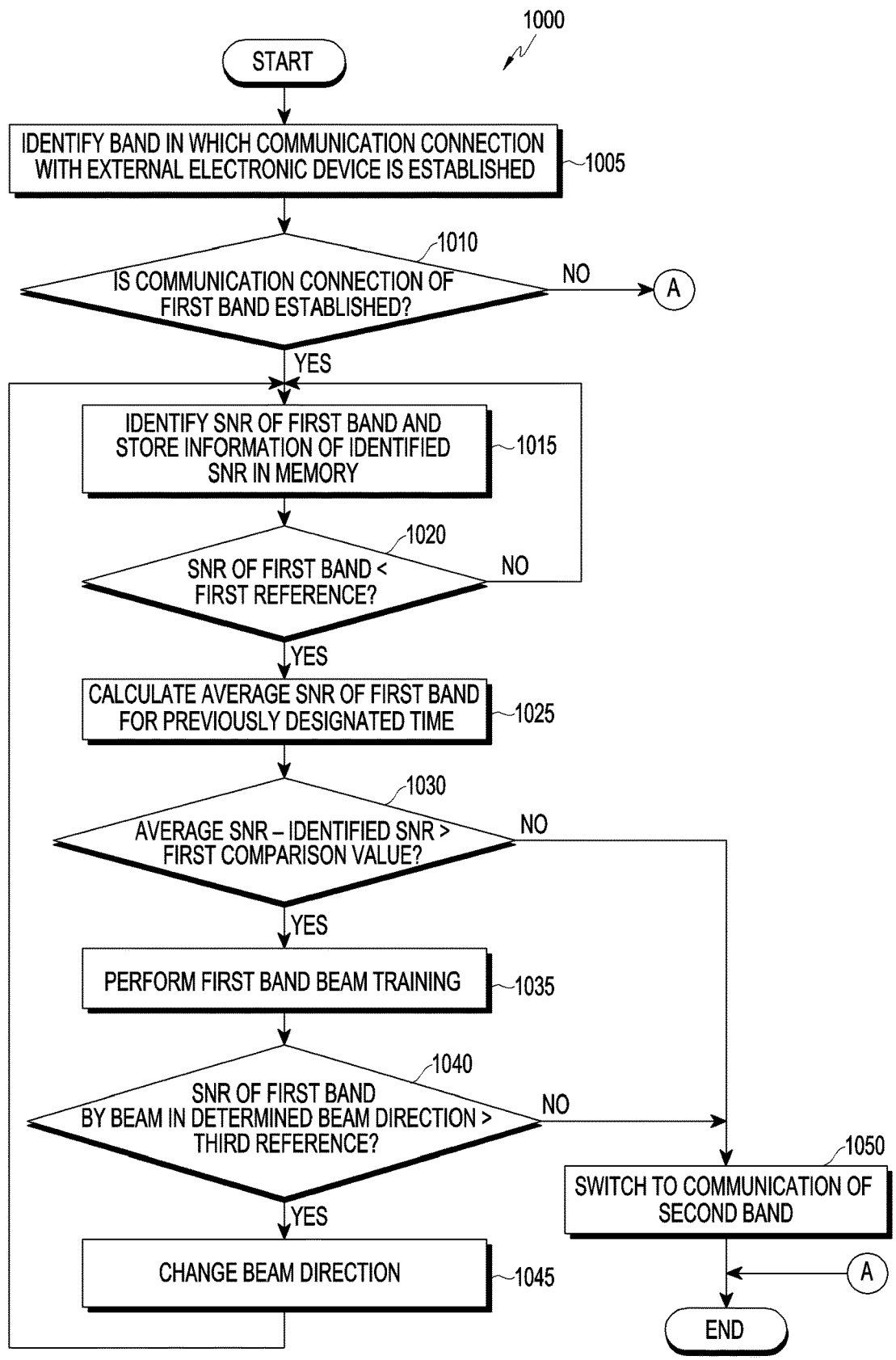
FIG. 10 is a flowchart illustrating an operation of controlling data communication of an electronic device according to various embodiments of the disclosure.

FIG. 10 is a flowchart 1000 illustrating an operation of controlling data communication of an electronic device according to various embodiments of the disclosure. The method of controlling data communication may be performed by at least one of an electronic device (e.g., the electronic device 101 or 201), at least one processor (e.g., the processor 120 or 330) of the electronic device, or a controller of the electronic device.

Referring to FIG. 10, an electronic device that supports both directional wireless communication in a first band (communication in the first band) and omnidirectional wireless communication in a second band (communication in the second band) may detect interruption or deterioration of communication in the first band using an SNR of the first band while performing the communication in the first band with an external electronic device, and may determine whether a beam direction mismatch of the electronic device occurs through an operation of detecting a sudden change in SNR of the first band.

In operation 1005, the electronic device (e.g., the processor 330) may identify the band in which a communication connection with the external electronic device (e.g., the external electronic device 261) is established.

According to an embodiment, the electronic device may include a first wireless communication circuit (e.g., the first wireless communication circuit 322), configured to support communication in the first band, and a second wireless communication circuit (e.g., the second wireless communication circuit 324), configured to support communication in the second band, by applying beamforming technology thereto.

In operation 1010, the electronic device (e.g., the processor 330) may determine whether the communication connection of the first band is established.

According to an embodiment, when it is determined that the communication connection of the first band is established in operation 1010, the electronic device may perform operation 1015, and otherwise may terminate the operation of the embodiment.

In operation 1015, the electronic device (e.g., the processor 330) may identify an SNR of the first band, and may store information on the identified SNR in memory.

In operation 1020, the electronic device (e.g., the processor 330) may determine whether the SNR of the first band is less than a first reference.

According to an embodiment, the first reference may be a value determined based on the effective coverage of the communication in the first band. For example, the first reference may be the first reference 691 of FIG. 6.

According to an embodiment, when the electronic device determines that the SNR of the first band is less than the first reference, the electronic device may perform operation 1025, and otherwise may perform operation 1015 again based on a designated period or event occurrence (e.g., motion detection or data transmission of the electronic device).

Operations 1005, 1010, and 1020 described above may respectively correspond to operations 505, 510, and 520 of FIG. 5.

In operation 1025, the electronic device (e.g., the processor 330) may calculate an average of the SNR of the first band for a previously designated time.

According to an embodiment, the electronic device may calculate the average of the SNR of the first band for the previously designated time using SNR information of the first band for a designated time stored in the memory in advance to identify the SNR of the first band.

In operation 1030, the electronic device (e.g., the processor 330) may determine whether the difference between the calculated average of the SNR and the identified SNR is greater than a designated first comparison value $\Delta\gamma$.

According to an embodiment, the first comparison value may be a reference value used to distinguish a sudden change in the SNR of the first band. For example, the first comparison value may be a value previously determined through experimentation.

According to an embodiment, when the difference between the average SNR of the first band for the previously designated time and the current SNR value is greater than the designated first comparison value, the electronic device may determine that a sudden change in SNR of the first band has occurred, and accordingly, may determine that a beam direction mismatch has occurred.

According to an embodiment, when the electronic device determines that the difference between the calculated average of the SNR and the identified SNR is greater than the designated first comparison value in operation 1030, the electronic device may perform operation 1035, and otherwise may perform operation 1050.

In operation 1035, the electronic device (e.g., the processor 330) may perform beam training of the first band.

According to an embodiment, the electronic device may perform beam training using SLS, BRP, and/or BT, which are beamforming protocols of the 802.11ad standard technology, and the electronic device may determine the direction in which the performance of a link (or a channel) is superior as the beam direction according to the performance of the beam training.

According to an embodiment, the beam-training operation for the first band may be an operation of dividing a space into a designated number of sectors in the communication in the first band and determining the beam direction using all of the sectors resulting from the division when the beam training of the first band is performed as in the embodiment of operation 535 of FIG. 5 described above.

According to another embodiment, the beam-training operation for the first band may be an operation of determining the beam direction using some sectors of the space in the communication in the first band according to the operations of the embodiment of FIG. 7 described above.

In operation 1040, the electronic device (e.g., the processor 330) may determine whether the SNR of the first band for the beam in the beam direction determined through operation 1035 is greater than a third reference.

According to an embodiment, the third reference may be determined as a value sufficient to enable communication in the first band. For example, the third reference may be experimentally determined to be a value equal to or greater than the first reference.

According to an embodiment, in operation 1040, when it is determined that the SNR of the first band for the beam in the determined beam direction is greater than the third reference, the electronic device may perform operation 1045, and otherwise may perform operation 1050.

In operation 1045, the electronic device (e.g., the processor 330) may change the beam direction.

According to an embodiment, the electronic device may change the beam direction according to a designated condition while maintaining communication in the first band.

In operation 1050, the electronic device (e.g., the processor 330) may switch from the communication in the first band to the communication in the second band.

According to an embodiment, the electronic device may switch the communication band to the communication in the second band so as to perform communication in the second band instead of communication in the first band, and may perform communication in the second band with the external electronic device.

For example, when switching the communication band to the communication in the second band, the electronic device may use the second wireless communication circuit to perform the communication in the second band with the external electronic device while performing an operation for communication access of the second band using the second wireless communication circuit. As another example, the electronic device may be in a state of being connected to the external electronic device through both the communication in the first band and the communication in the second band using the first wireless communication circuit and the second wireless communication circuit. In this case, when the communication band is switched to the communication in the second band, the electronic device may perform communication in the second band with the external electronic device without performing the operation for communication access in the second band.

Operations 1035 to 1050 described above may respectively correspond to operations 535 to 550 of FIG. 5.

In the embodiment of FIG. 10 described above, it has been described that operations 1015 and 1030 are performed once. However, according to another embodiment, in order to prevent the case in which the electronic device erroneously determines beam direction mismatch of the electronic device due to a change in the SNR of the first band in operation 1030 of comparing the difference between the average of the SNR of the first band for the designated time and the currently identified SNR with the first comparison value, the electronic device may determine that beam direction mismatch of the electronic device has occurred only when a sudden decrease in the SNR of the first band is continuously identified by repeatedly performing the operation of identifying the SNR of the first band and determining whether the difference between the calculated average of the SNR and the identified SNR is greater than the first comparison value a designated number of times or continuously for a designated time. As another embodiment, after operation 1030, the operation of identifying the SNR of the first band and determining whether the difference between the calculated average of the SNR and the identified SNR is greater than the designated first comparison value may be repeatedly performed the designated number of times or continuously for the designated time. For example, the designated number of times and/or the designated time may be predetermined through experimentation.

Figure 11:
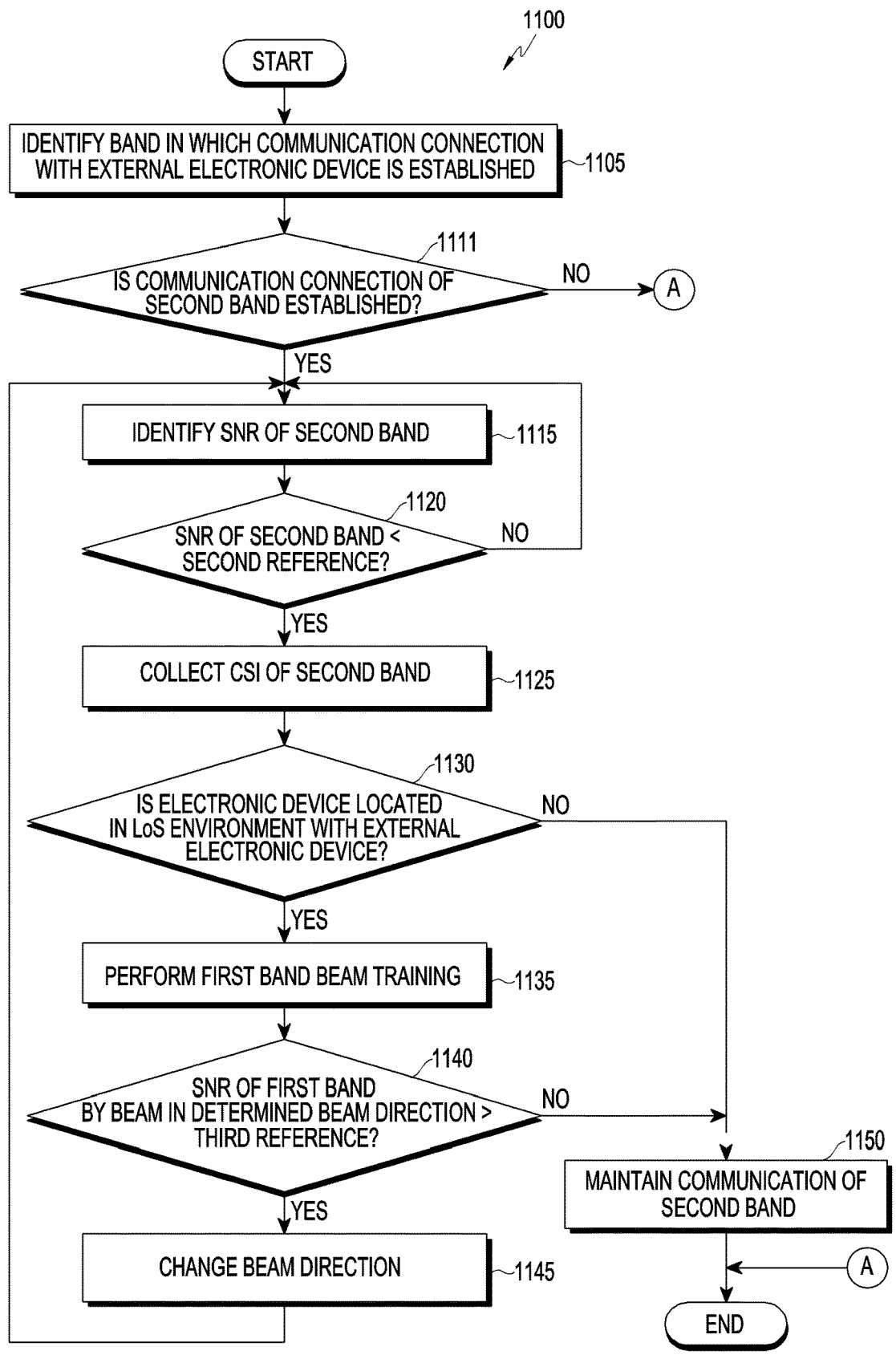
FIG. 11 is a flowchart illustrating an operation of controlling data communication of an electronic device according to various embodiments of the disclosure.

FIG. 11 is a flowchart 1100 illustrating an operation of controlling data communication of an electronic device according to various embodiments of the disclosure. A method of controlling data communication may be performed by at least one of an electronic device (e.g., the electronic device 101 or 201), at least one processor (e.g., the processor 120 or 330) of the electronic device, or a controller of the electronic device.

Referring to FIG. 11, when an electronic device that supports both directional wireless communication in a first band (communication in the first band) and omnidirectional wireless communication in a second band (communication in the second band) performs communication in the second band with an external electronic device, the electronic device may determine whether the electronic device is located in an LoS environment of the second band using an SNR of the second band and channel state information (CSI) of the second band, and may switch from the communication in the second band to the communication in the first band or maintain the communication in the second band according to the determination result.

In operation 1105, the electronic device (e.g., the processor 330) may identify the band in which a communication connection with the external electronic device (e.g., the external electronic device 261) is established.

According to an embodiment, the electronic device may include a first wireless communication circuit (e.g., the first wireless communication circuit 322), configured to support communication in the first band, and a second wireless communication circuit (e.g., the second wireless communication circuit 324), configured to support communication in the second band, by applying a beamforming technology thereto.

In operation 1110, the electronic device (e.g., the processor 330) may identify the band in which a communication connection of the second band is established.

According to an embodiment, when it is determined that the communication connection of the second band is established in operation 1110, the electronic device may perform operation 1115, and otherwise may terminate the operation of the embodiment.

In operation 1115, the electronic device (e.g., the processor 330) may identify an SNR of the second band.

In operation 1120, the electronic device (e.g., the processor 330) may determine whether the SNR of the second band is greater than a second reference.

According to an embodiment, the second reference may be a value identified to be sufficient for the electronic device to enter a first band coverage.

According to an embodiment, when the SNR of the second band is greater than the second reference, the electronic device may determine that the electronic device enters the first band coverage in which the communication in the first band is possible. For example, when the SNR of the second band is greater than the second reference, the electronic device may determine that the use of the communication in the first band is more efficient than the use of the communication in the second band.

According to an embodiment, when it is determined that the SNR of the second band is greater than the second reference in operation 1120, the electronic device may perform operation 1125, and otherwise may perform operation 1115 again at a designated period.

In operation 1125, the electronic device (e.g., the processor 330) may collect the CSI of the second band.

In operation 1130, the electronic device (e.g., the processor 330) may determine whether the electronic device is located in the LoS environment with the external electronic device based on the CSI.

According to an embodiment, the electronic device may use a channel impulse response (CIR), which is a time-axis signal (information) of the second band included in the CSI of the second band, to thereby determine (assume) the component having the greatest power of the CIR (the largest signal response strength) as the LoS component. For example, the electronic device may determine whether the electronic device is in the LoS environment with the external electronic device by using a technique for determining how much power the LoS component has. For example, when the greatest signal response strength of the CIR is greater than or equal to a designated reference value, the electronic device may determine that the electronic device is in a LoS environment with the external electronic device. As another example, the electronic device may identify the value of kurtosis and/or skew using a statistical value of the CIR, and may determine whether the electronic device is located in the LoS environment with the external electronic device using the identified value. For example, in the LoS environment, the kurtosis may have a high value and the skew may have a low value, and accordingly, the kurtosis and/or skew may be experimentally measured in the LoS environment and a non-LoS (NLoS) environment, and may be used as a criterion for determining the LoS. For example, the electronic device may determine whether the electronic device is located in an LoS environment with the external electronic device by comparing designated reference kurtosis and/or designated reference skew with the identified kurtosis and/or skew.

According to an embodiment, when it is determined in operation 1130 that the electronic device is located in an LoS environment with the external electronic device, the electronic device may perform operation 1135, and otherwise may perform operation 1150.

In operation 1135, the electronic device (e.g., the processor 330) may perform beam training of the first band.

According to an embodiment, the electronic device may perform beam training using SLS, BRP, and/or BT, which are beamforming protocols of the 802.11ad standard technology, and the electronic device may determine the direction in which the performance of a link (or a channel) is superior as the beam direction according to the performance of the beam training.

According to an embodiment, the beam-training operation for the first band may be an operation of dividing a space into a designated number of sectors in the communication in the first band and determining the beam direction using all of the sectors resulting from the division when the beam training of the first band is performed as in the embodiment of operation 535 of FIG. 5 described above.

According to another embodiment, the beam-training operation for the first band may be an operation of determining the beam direction using some sectors of the space in the communication in the first band according to the operations of the embodiment of FIG. 7 described above.

In operation 1140, the electronic device (e.g., the processor 330) may determine whether the SNR of the first band for the beam in the beam direction determined through operation 1135 is greater than a third reference.

According to an embodiment, the third reference may be determined as a value sufficient to enable communication in the first band. For example, the third reference may be experimentally determined to be a value equal to or greater than the first reference.

According to an embodiment, in operation 1140, when it is determined that the SNR of the first band for the beam in the determined beam direction is greater than the third reference, the electronic device may perform operation 1145, and otherwise may perform operation 1150.

In operation 1145, the electronic device (e.g., the processor 330) may configure the beam direction.

According to an embodiment, the electronic device may configure the beam direction, and may switch from the communication in the second band to the communication in the first band.

In operation 1150, the electronic device (e.g., the processor 330) may maintain the communication in the second band.

Operations 1135 and 1140 described above may respectively correspond to operations 535 to 540 of FIG. 5.

Figure 12:
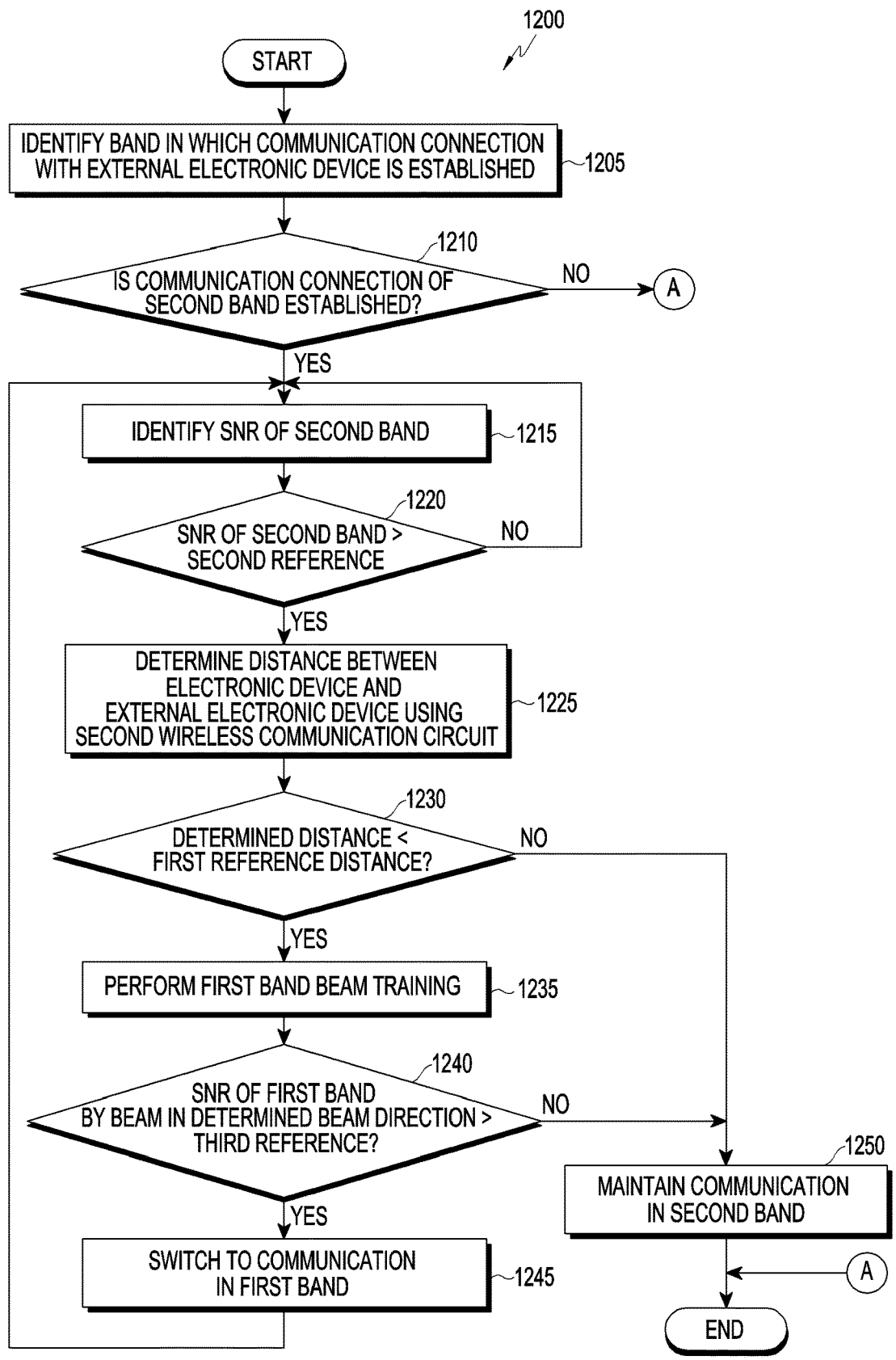
FIG. 12 is a flowchart illustrating an operation of controlling data communication of an electronic device according to various embodiments of the disclosure.

FIG. 12 is a flowchart 1200 illustrating an operation of controlling data communication of an electronic device according to various embodiments of the disclosure. A method of controlling data communication may be performed by at least one of an electronic device (e.g., the electronic device 101 or 201), at least one processor (e.g., the processor 120 or 330) of the electronic device, or a controller of the electronic device.

Referring to FIG. 12, when an electronic device that supports both directional wireless communication in a first band (communication in the first band) and omnidirectional wireless communication in a second band (communication in the second band) performs communication in the second band with an external electronic device, the electronic device may determine whether to switch to the first band using the SNR of the second band and distance information of the second band.

In operation 1205, the electronic device (e.g., the processor 330) may identify the band in which a communication connection with the external electronic device is established.

According to an embodiment, the electronic device may include a first wireless communication circuit (e.g., the first wireless communication circuit 322) configured to support communication in the first band and a second wireless communication circuit (e.g., the second wireless communication circuit 324) configured to support communication in the second band by applying a beamforming technology thereto.

In operation 1210, the electronic device (e.g., the processor 330) may determine whether a communication connection of the second band is established.

According to an embodiment, when it is determined that the communication connection of the second band is established in operation 1210, the electronic device may perform operation 1215, and otherwise may terminate the operation of the embodiment.

In operation 1215, the electronic device (e.g., the processor 330) may identify an SNR of the second band.

In operation 1220, the electronic device (e.g., the processor 330) may determine whether the SNR of the second band is greater than a second reference.

According to an embodiment, the second reference (e.g., the second reference 693 of FIG. 6) may be determined based on the effective coverage of the communication in the first band.

According to an embodiment, when it is determined that the SNR of the second band is greater than the second reference, the electronic device may perform operation 1225, and otherwise may perform operation 1215 based on a designated period or event occurrence (e.g. motion detection of the electronic device or data transmission) again.

In operation 1225, the electronic device (e.g., the processor 330) may determine the distance between the electronic device and the external electronic device using the second wireless communication circuit.

According to an embodiment, the electronic device may perform FTM of the second band. For example, the electronic device may determine an RRT based on the FTM result of the second band, and may determine the distance between the electronic device and the external electronic device based on the RTT.

In operation 1230, the electronic device (e.g., the processor 330) may determine whether the determined distance is less than a first reference distance.

According to an embodiment, the first reference distance may be a distance value indicating the first band coverage. For example, the first reference distance may be a value determined in advance through experimentation or determined by the electronic device.

According to an embodiment, the operation of determining whether the determined distance is less than the first reference distance may be performed in order for the electronic device to determine whether the low SNR of the first band, which is less than the first reference, is caused due to a beam direction mismatch of the electronic device or due to moving out of the first band coverage. For example, when the determined distance is less than the first reference distance, the electronic device may determine that it is caused due to the beam direction mismatch of the electronic device, and accordingly, may perform operation 1235 related thereto. As another example, when the determined distance using the second band is greater than or equal to the first reference distance, the electronic device may determine that the electronic device is out of the first band coverage, and accordingly, may perform an operation of switching from communication in the first band to communication in the second band in operation 1250.

According to an embodiment, when the electronic device determines in operation 1230 that the determined distance is less than the first reference distance, the electronic device may perform operation 1235, and otherwise, may perform operation 1250.

In operation 1235, the electronic device (e.g., the processor 330) may perform beam training of the first band.

According to an embodiment, the electronic device may perform beam training using SLS, BRP, and/or BT, which are beamforming protocols of the 802.11ad standard technology, and according to the beam training, the electronic device may determine the direction in which a link (or a channel) has superior performance as the beam direction.

According to an embodiment, the beam-training operation for the first band may be an operation of dividing a space into a designated number of sectors in the communication in the first band and determining the beam direction using all of the sectors resulting from the division when the beam training of the first band is performed, as in the embodiment of operation 535 of FIG. 5 described above.

According to another embodiment, the beam-training operation for the first band may be an operation of determining the beam direction using some sectors of the space through the communication in the first band according to the operations of the embodiment of FIG. 7 described above.

In operation 1240, the electronic device (e.g., the processor 330) may determine whether the SNR of the first band for the beam in the beam direction determined through operation 1235 is greater than a third reference.

According to an embodiment, the third reference may be determined as a value sufficient to enable communication in the first band. For example, the third reference may be experimentally determined to be a value equal to or greater than the first reference.

According to an embodiment, when the electronic device determines that the SNR of the first band for the beam in the determined beam direction is greater than the third reference in operation 1240, the electronic device may perform operation 1245, and otherwise may perform operation 1250.

In operation 1245, the electronic device (e.g., the processor 330) may switch from the communication in the second band to the communication in the first band.

According to an embodiment, the electronic device may switch the communication band to the communication in the first band so as to perform the communication in the first band instead of the communication in the second band, and may perform the communication in the first band with the external electronic device.

For example, when the electronic device switches the communication band to the communication in the first band, the electronic device may perform the communication in the first band with the external electronic device while performing an operation for a communication connection of the first band using the first wireless communication circuit. As another example, the electronic device may be in a state of being connected to the external electronic device through both the communication in the first band and the communication in the second band using the first wireless communication circuit and the second wireless communication circuit. In this case, when the communication band is switched to the communication in the first band, the electronic device may perform the communication in the first band with the external electronic device without performing the operation for the communication connection of the first band.

In operation 1250, the electronic device (e.g., the processor 330) may maintain the communication in the second band.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments, in a storage medium that stores instructions, the instructions may be configured, when executed by at least one circuit, to cause the at least one circuit to perform at least one operation. The at least one operation may include: performing directional wireless communication with an external electronic device capable of performing directional wireless communication and omni-directional wireless communication using a first wireless communication circuit configured to support the directional wireless communication using beamforming; determining the distance between the electronic device and the external electronic device based at least partially on a signal of the external electronic device, which is received using a second wireless communication circuit configured to support the omnidirectional wireless communication when interruption or deterioration of the directional wireless communication is detected; and determining whether to reattempt the directional wireless communication using the first wireless communication circuit or to start the omnidirectional wireless communication using the second wireless communication circuit based at least partially on the determined distance.

According to various embodiments, the reattempting the directional wireless communication using the first wireless communication circuit based at least partially on the determined distance may include changing the beam direction of the directional wireless communication when the determined distance is within a selected distance.

According to various embodiments, the at least one operation may further include determining an SNR associated with the signal of the external electronic device, an amount of change in the SNR per unit time, and/or link loss, and the detection of the interruption or deterioration of the directional wireless communication may be executed based at least partially on the determined SNR, the determined amount of change in SNR, and/or the determined link loss.

According to various embodiments, the at least one operation may further include determining an SNR associated with the signal of the external electronic device, an RTT, and/or an FTM, and the determining the distance between the electronic device and the external electronic device may be executed based at least partially on the determined SNR, the determined RTT, and/or the determined FTM.

According to various embodiments, the at least one operation may further include reattempting the directional wireless communication using the first wireless communication circuit when the determined distance is less than a designated reference distance.

The invention claimed is:
1. An electronic device comprising:
  a housing;
  a first wireless communication circuit located inside the housing and configured to support directional wireless communication using beamforming;
  a second wireless communication circuit located inside the housing and configured to support omnidirectional wireless communication;
  a processor configured to be operatively connected to the first wireless communication circuit and the second wireless communication circuit; and
  a memory configured to be operatively connected to the processor,
  wherein the memory stores instructions that, when executed, cause the processor to:
    perform the directional wireless communication together with an external electronic device configured to perform the directional wireless communication and the omnidirectional wireless communication, using the first wireless communication circuit,
    determine a distance between the electronic device and the external electronic device based at least partially on a signal of the external electronic device received by the second wireless communication circuit, when interruption or deterioration of the directional wireless communication is detected, and
    determine whether to reattempt the directional wireless communication using the first wireless communication circuit based at least partially on the determined distance, or to start the omnidirectional wireless communication using the second wireless communication circuit.
2. The electronic device of claim 1, wherein the instructions cause the processor to change a beam direction of the directional wireless communication when the determined distance is within a selected distance.
3. The electronic device of claim 1, wherein the instructions cause the processor to:
  determine a signal-to-noise ratio (SNR) associated with the signal of the external electronic device, an amount of change in the SNR per unit time, and/or a link loss, and
  detect whether the directional wireless communication is interrupted or deteriorated based at least partially on the determined SNR, the determined amount of change in SNR, and/or the determined link loss.
4. The electronic device of claim 1, wherein the instructions cause the processor to:
  determine a signal-to-noise ratio (SNR) associated with the signal of the external electronic device, a round-trip time (RTT), and/or a fine timing measurement (FTM), and
  determine a distance between the electronic device and the external electronic device based at least partially on the determined SNR, the determined RTT, and/or the determined FTM.
5. The electronic device of claim 1, wherein the external electronic device is one of an access point (AP) device or a mobile device.
6. The electronic device of claim 1, wherein the instructions cause the processor to:
  reattempt the directional wireless communication using the first wireless communication circuit when the determined distance is less than a designated reference distance.
7. The electronic device of claim 6, wherein the instructions cause the processor to:
  start the omnidirectional wireless communication using the second wireless communication circuit when the determined distance is equal to or greater than the designated reference distance.
8. The electronic device of claim 1, wherein the instructions cause the processor to:
  determine a distance between the electronic device and the external electronic device based at least partially on the signal of the external electronic device, which is received through the second wireless communication circuit while performing the omnidirectional wireless communication with the external electronic device using the second wireless communication circuit, and
  start the directional wireless communication using the first wireless communication circuit based at least partially on the determined distance while performing the omnidirectional wireless communication.
9. The electronic device of claim 8, wherein the instructions cause the processor to:
  start the directional wireless communication using the first wireless communication circuit based at least partially on channel state information of the omnidirectional communication of the second wireless communication circuit when the determined distance is less than a selected distance while performing the omnidirectional wireless communication.
10. The electronic device of claim 9, wherein the instructions cause the processor to:
  identify whether the electronic device is located in a line-of-sight (LoS) environment of the omnidirectional wireless communication of the second wireless communication circuit based at least partially on channel state information of the omnidirectional wireless communication of the second wireless communication circuit, and start the directional wireless communication using the first wireless communication circuit when the electronic device is located in a LoS environment of the omnidirectional wireless communication of the second wireless communication circuit.

11. A method of controlling data communication of an electronic device, the method comprising:

performing directional wireless communication with an external electronic device configured to perform directional wireless communication and omnidirectional wireless communication by using a first wireless communication circuit configured to support directional wireless communication using beamforming;

determining a distance between the electronic device and the external electronic device based at least partially on a signal of the external electronic device received by a second wireless communication circuit configured to support omnidirectional wireless communication when interruption or deterioration of the directional wireless communication is detected; and determining whether to reattempt the directional wireless communication using the first wireless communication circuit based at least partially on the determined distance or to start the omnidirectional wireless communication using the second wireless communication circuit.

12. The method of claim 11, wherein the reattempting the directional wireless communication using the first wireless communication circuit based at least partially on the determined distance comprises:

changing a beam direction of the directional wireless communication when the determined distance is within a selected distance.

13. The method of claim 11, further comprising:

determining a signal-to-noise ratio (SNR) associated with the signal of the external electronic device, an amount of change in SNR per unit time, and/or a link loss, wherein detection of the interruption or deterioration of the directional wireless communication is performed based at least partially on the determined SNR, the determined amount of change in SNR, and/or the determined link loss.

14. The method of claim 11, further comprising:

determining a signal-to-noise ratio (SNR) associated with the signal of the external electronic device, a round-trip time (RTT), and/or a fine timing measurement (FTM), wherein the determining the distance with the external electronic device is performed based at least partially on the determined SNR, the determined RTT, and/or the determined FTM.

15. A non-transitory storage medium that stores instructions, wherein the instructions are configured, when executed by at least one circuit, to cause the at least one circuit to perform at least one operation, and the at least one operation comprises:

performing directional wireless communication with an external electronic device configured to perform directional wireless communication and omnidirectional wireless communication using a first wireless communication circuit configured to support the directional wireless communication using beamforming;

determining a distance between an electronic device and the external electronic device based at least partially on a signal of the external electronic device, which is received using a second wireless communication circuit configured to support the omnidirectional wireless communication when interruption or deterioration of the directional wireless communication is detected; and determining whether to reattempt the directional wireless communication using the first wireless communication circuit or to start the omnidirectional wireless communication using the second wireless communication circuit based at least partially on the determined distance.

* * * * *